(12) United States Patent
Rekow et al.

(10) Patent No.: US 7,998,838 B2
(45) Date of Patent: Aug. 16, 2011

(54) METHOD AND APPARATUS FOR SCRIBING A LINE IN A THIN FILM USING A SERIES OF LASER PULSES

(75) Inventors: Matthew Rekow, Santa Cruz, CA (US); Richard Murison, St-Lazare (CA); Tullio Panarello, St-Lazare (CA); Corey Dunsky, Los Gatos, CA (US)

(73) Assignee: ESI-PyroPhotonics Lasers, Inc., Dollard-des-Ormeaux, Quebec (CA)

( * ) Notice: Subject to any disclaimer, the term of this patent is extended or adjusted under 35 U.S.C. 154(b) by 0 days.

(21) Appl. No.: 12/954,385

(22) Filed: Nov. 24, 2010

(65) Prior Publication Data
US 2011/0129958 A1 Jun. 2, 2011

Related U.S. Application Data

(60) Provisional application No. 61/347,085, filed on May 21, 2010, provisional application No. 61/296,525, filed on Jan. 20, 2010, provisional application No. 61/265,259, filed on Nov. 30, 2009.

(51) Int. Cl.
*H01L 21/00* (2006.01)
(52) U.S. Cl. ............... 438/460; 372/25; 438/458
(58) Field of Classification Search ............ 438/95; 219/121; 372/25
See application file for complete search history.

(56) References Cited

U.S. PATENT DOCUMENTS

| | | | |
|---|---|---|---|
| 4,734,550 A | 3/1988 | Imamura et al. | |
| 5,400,350 A | 3/1995 | Galvanauskas | |
| 5,702,565 A | 12/1997 | Wu et al. | |
| 5,886,808 A | 3/1999 | Skeldon et al. | |
| 6,372,538 B1 | 4/2002 | Wendt et al. | |
| 6,826,209 B1 | 11/2004 | Morita et al. | |
| 6,885,683 B1 | 4/2005 | Fermann et al. | |

(Continued)

FOREIGN PATENT DOCUMENTS
WO WO 2004/107510 12/2004

OTHER PUBLICATIONS

Compaan et al., "Optimization of Laser Scribing for Thin-Film PV Modules: Final Technical Progress Report Apr. 12, 1995-Oct. 11, 1997" National Renewable Energy Laboratory, Jun. 1998, Golden Colorado; retrieved from the Internet: <http://www.nrel.gov/docs/legosti/fy98/24842.pdf>.

(Continued)

*Primary Examiner* — Thao P. Le
(74) *Attorney, Agent, or Firm* — Kilpatrick Townsend & Stockton LLP

(57) ABSTRACT

A series of laser pulses in a pulse train, each pulse with a predetermined temporal power shape, scribes a line in a thin film of material on a substrate. The predetermined temporal pulse shape has a fast risetime and fast falltime and a pulse length between 10% power points of less than 10 ns. Scribing a line in the thin film is achieved by placing the series of laser pulse spots on the line to be scribed such that there is some overlapping area between adjacent laser pulse spots along the line. The use of a series of laser pulses with the predetermined pulse shape to scribe a line in the thin film results in a better quality and cleaner scribing process compared to that achieved with a conventional pulse shape.

27 Claims, 14 Drawing Sheets

U.S. PATENT DOCUMENTS

| | | | |
|---|---|---|---|
| 7,256,930 B2 | 8/2007 | Liu | |
| 7,428,253 B2 | 9/2008 | Murison et al. | |
| 2005/0088724 A1 | 4/2005 | Lee et al. | |
| 2008/0099453 A1 | 5/2008 | Smart | |
| 2008/0242056 A1 | 10/2008 | Sercel et al. | |
| 2009/0245301 A1* | 10/2009 | Peng et al. | 372/25 |
| 2009/0245302 A1* | 10/2009 | Baird et al. | 372/25 |
| 2009/0255911 A1* | 10/2009 | Krishnaswami et al. | 219/121.69 |
| 2010/0089886 A1* | 4/2010 | Sercel et al. | 219/121.72 |
| 2010/0237051 A1* | 9/2010 | Gu | 219/121.68 |
| 2010/0246611 A1* | 9/2010 | Sun | 372/18 |

OTHER PUBLICATIONS

Di Teodoro et al., "High-Power Pulsed Fibre Source at 1567 nm," Electronics Letters, Nov. 25, 2004, vol. 40, Issue 24, pp. 1525-1526.

Mason et al., "Advanced Laser Processing for Industrial Solar Cell Manufacturing (Alpinism)," S/P2/00368/REP, published version, BP Solar Limited, Crown Copyright 2006; retrieved from the Internet: <http://webarchive.nationalarchives.gov.uk/+/http://www.berr.gov.uk/files/file30593.pdf>, 62 pages total.

Skeldon et al., "A High-Bandwidth Electrical-Waveform Generator Based on Aperture-Coupled Striplines for OMEGA Pulse-Shaping Applications,", CLEO 98. Technical Digest. Summaries of papers presented at the Conference on Lasers and Electro-Optics, 1998., May 3-8, 1998, pp. 345-356.

International Search Report and Written Opinion of PCT Application No. PCT/US2010/057976, mailed Feb. 3, 2011, 9 pages total.

\* cited by examiner

METHOD AND APPARATUS FOR SCRIBING A LINE IN A THIN FILM USING A SERIES OF LASER PULSES

CROSS-REFERENCES TO RELATED APPLICATIONS

This application claims priority to U.S. Provisional Patent Application Nos. 61/265,259, filed on Nov. 30, 2009, 61/296,525, filed on Jan. 20, 2010, and 61/347,085, filed on May 21, 2010, the disclosures of which are hereby incorporated by reference in their entirety for all purposes.

BACKGROUND OF THE INVENTION

Pulsed laser sources, such as Nd:YAG lasers, have been used to perform laser-based material processing for applications such as marking, engraving, micro-machining, cutting, and scribing. Despite the progress made using laser sources, there is a need in the art for improved methods and systems related to laser scribing.

SUMMARY OF THE INVENTION

The present invention relates generally to laser processing of materials. More particularly, the present invention relates to methods and apparatus employing a series of laser pulses which have been specifically shaped to provide better processing quality and higher throughput in laser processing applications. The present invention also relates to scribing of thin film materials on a substrate. However, the invention has broader applicability and can be applied to other applications and materials.

One process in which lasers are used is scribing lines in a thin film of materials on a thicker substrate. A thin film is defined in very general terms as a layer or layers of material that can be only a few molecules thick or thicker. As an example, a thin film can be between 25 nm and 10 microns in thickness. As an example, a thin film can include one layer or multiple layers of the same or different materials. A substrate is a material upon which the layers are deposited and typically the substrate is substantially thicker than the thin film. There are many examples of the use of thin films in areas such as electronic devices, electro-optical devices, optical devices, and corrosion protection. For example, photovoltaic or solar cells may have thin films including one or more layers of amorphous silicon, cadmium telluride, cadmium sulfide, copper indium diselenide, copper indium gallium diselenide, gold, silver, or molybdenum, and electrodes made using thin films of transparent conductive oxide (TCO) material such as indium tin oxide (ITO), zinc oxide (ZnO) and oxides of other metals such as aluminum, or molybdenum. The material of the thin film layers is not restricted to only these examples, however. Thin films of these and other materials are also used in flat panel displays and digital displays. The device may include a thin film including a single thin layer of material or a number of thin layers where each layer can be a same or different material. Thus, as described herein, the "thin film" and "thin film material" may include any film having one or more layers of materials. There are many examples of suitable substrate materials: metallic films or foils are an example. An inert material such as glass or fused silica is also suitable. The choice of suitable substrate materials is not limited to these, however.

Scribing a line in a thin film material on a substrate typically means to remove all the thin film material down to a sub-layer or down to the substrate and to do this along a line. The line could be a straight line, a curved line, a line as a closed loop, or various lines in various patterns or shapes. For relatively thick lines, a mechanical scribing tool such as a knife can be used but it often results in rough edges and incomplete removal of the thin film material. The width of the line required in electronic devices can be very thin. Lasers are used for the application of scribing lines in thin film materials because they may be used to cut a very thin line to cleanly remove the thin film material. A further advantage of lasers over mechanical means to scribe a line is that a laser can scribe a groove down to a lower layer and stop there.

When scribing a thin film during the manufacture of an electronic device, one possible goal is to cleanly remove all the material in the groove being cut. Residue either in the groove or on adjacent areas can cause problems. Another issue that can affect the quality of the process is potential thermal or other damage to the material near the groove and the groove walls and also damage to the substrate itself. Any damage to the area near the scribed line can compromise the functionality and reliability of the device, and therefore a goal of the manufacturing process is to eliminate or reduce any damage caused by the scribing process to nearby areas.

Laser scribing of a thin film on a substrate is often performed by transmitting the laser beam through the substrate so as to access the bottom portion of the thin film. This process is referred to as second surface scribing or bottom surface scribing. Of course, for this to occur, the substrate must be substantially transparent at the laser wavelength. An example of a transparent substrate would be glass. Furthermore, in most cases, the thin film is a strong absorber at the laser wavelength chosen so that the laser light is strongly absorbed in the thin film with the strongest absorption starting at the bottom edge of the film, thereby initiating a process to cause it to be removed. In many cases, it is desired to scribe a thin film on a substrate where the substrate is not substantially transparent. Such a substrate may be a metal, for example, chosen as a good heat conductor. Scribing the thin film on a substrate using a laser incident from above on the thin film is referred to as first surface scribing or top surface scribing. Top surface scribing of thin films using lasers with a conventional pulse shape has not been completely successful. According to embodiments of the present invention, methods and apparatus are provided whereby successful top surface scribing of thin films is achieved using a series of laser pulses with a predetermined pulse shape.

Depending on the application and the materials to be processed, it can be advantageous to be able to select the various characteristics of the laser pulses, including wavelength, pulse energy, pulse width, pulse repetition rate, peak power or energy, and/or temporal pulse shape, as appropriate to the particular application.

Many existing high power pulsed lasers characterized by pulse energies greater than 0.5 mJ per pulse rely on techniques such as Q-switching and mode locking to generate optical pulses. However, such lasers produce optical pulses with characteristics that are predetermined by the laser's cavity geometry, the mirror reflectivities, and the like. Using such lasers, it is generally difficult to achieve an optimal pulse shape for the application at hand and therefore in many cases, the laser processing has some deficiencies. In particular, for Q-switched lasers, a significant amount of the pulse energy is present in a tail which can extend for a significant time period after the majority of the pulse energy has been provided.

Embodiments of the present invention provide a system and method for first surface scribing of thin films of materials on a substrate that improves the quality and the yield of the thin film scribing process compared to that achieved using systems and methods for first surface scribing using a laser with a conventional pulse shape, for example, a Q-switched pulse. According to embodiments of the present invention, improved first surface scribing of thin films is provided by using a series of pulses with a pulse energy and a temporal pulse shape which restricts the time period during which the energy is deposited in the thin film and further restricts the amount of energy present in the tail of the laser pulse.

The present invention relates to a method to scribe or cut a line in a thin film of material on a substrate using a series of laser pulses shown schematically in FIG. 1 and consisting of individual pulses with a predetermined temporal pulse shape, the use of which pulse shape instead of the conventional temporal pulse shape emitted by a laser has various advantages to improve the quality and the yield of the thin film scribing process. The predetermined pulse shape is chosen to have beneficial properties for the thin film scribing application. In one embodiment, the scribing process uses a series of laser pulses whereby each pulse has the predetermined pulse shape, which can be described as a simple flat-top pulse shape with a rapidly-rising leading edge and rapidly-falling trailing edge as shown schematically in FIG. 2A. In an embodiment, the temporal pulse length is about 5 ns full width at 10% maximum power. In the scribing process where multiple pulses of the focused laser beam spot are scanned across a thin film material with some spot overlap, if a predetermined pulse of this flat-top form is used instead of the conventional temporal pulse shape previously used, significant improvements in the quality of the scribing process are achieved. U.S. Provisional Patent Application No. 61/265,259 filed on Nov. 30, 2009, titled "Method and Apparatus for Scribing a Line in a Thin Film Using a Series of Laser Pulses" describes examples of the scribing of thin film materials on a substrate and is hereby incorporated by reference in its entirety. U.S. Provisional Patent Application No. 61/296,525 filed on Jan. 10, 2010, titled "Method and Apparatus for Scribing a Line in a Thin Film Using a Series of Laser Pulses" describes examples of the scribing of thin film materials on a substrate and is hereby incorporated by reference in its entirety.

The use of a predetermined pulse shape in the thin film scribing process has a number of advantages. In one embodiment, a predetermined flat-top pulse shape is used for laser scribing of a CIGS (copper indium gallium diselenide) film with a molybdenum sub-layer on a metallic substrate, a structure used in photovoltaic devices, with clean removal of the CIGS material down to the molybdenum layer with only trace amounts of CIGS material remaining in the scribed groove. In addition, there is no evident region of thermal damage in the adjacent material. The use of a predetermined pulse shape rather than the conventional laser pulse shape provides a significant improvement in the quality and reliability of the devices generated thereby and also a significant improvement in the yield of the number of devices which are acceptable to advance into the next stage of manufacturing.

Most lasers are designed to provide maximum average power or pulse energy or repetition frequency but little consideration is given to the temporal shape of the output pulse. The conventional temporal pulse shape of a free running, Q-switched or mode-locked laser as shown schematically in FIG. 3 has a rising leading edge, a rounded top and a falling trailing edge which falls gradually. This pulse shape is determined primarily by the laser gain medium, the laser pumping means and the cavity design. Pulsed laser sources such as diode lasers can be pulsed in a simple manner by providing a pulsed electronic drive signal. The pulse shape of the optical laser pulse thus generated can be pre-determined by choosing the shape of the electronic drive signal to the diode laser. The shaped signal from such a pulsed laser source can then be amplified in a laser amplifier such as a fiber laser amplifier. In one embodiment of the present invention, an oscillator amplifier laser system of this design is provided to generate a series of laser pulses with a predetermined temporal pulse shape suitable for scribing thin film materials.

In another embodiment, a laser system is provided to generate a series of laser pulses with predetermined temporal pulse shape. Commonly assigned U.S. Pat. No. 7,428,253, entitled "Method and System for Pulsed Laser Source with Shaped Optical Waveforms" issued Sep. 27, 2008, describes examples of tunable pulsed laser sources and is hereby incorporated by reference in its entirety. The pulsed laser source includes a seed source adapted to generate a seed signal and an optical circulator having a first port coupled to the seed source, a second port, and a third port. The pulsed laser source also includes a modulator driver adapted to produce a shaped electrical waveform and an amplitude modulator coupled to the modulator driver and adapted to receive the shaped electrical waveform. The amplitude modulator is characterized by a first side coupled to the second port of the optical circulator and a second side. The pulsed laser source further includes a first optical amplifier characterized by an input end and a reflective end. The input end is coupled to the second side of the amplitude modulator. Moreover, the pulsed laser source includes a second optical amplifier coupled to the third port of the optical circulator.

In yet another embodiment, another laser design is provided to generate a series of laser pulses with a predetermined temporal pulse shape. U.S. Provisional Patent Application No. 61/186,317 filed on Jun. 11, 2009, titled "Stable Tunable High Power Pulse Laser Source" also describes examples of laser sources suitable for use according to embodiments of the present invention and is hereby incorporated by reference in its entirety. The pulsed laser source includes a stabilizing source adapted to generate stabilizing optical radiation, and an optical circulator having a first port coupled to the stabilizing source, a second port, and a third port. The pulsed laser source also includes a signal source adapted to produce a signal pulse of desired shape wherein the signal source is coupled to the second port of the optical circulator. The pulsed laser source further includes an optical amplifier coupled to the third port of the optical circulator.

In a further embodiment of this invention, a materials processing system is disclosed to scribe or cut lines in a layer or layers of thin film materials on a substrate. The system includes a laser which provides a predetermined temporal pulse shape or shapes to process thin film materials so as to achieve one or more of the following benefits: (1) clean removal of the material with minimal residue in the scribed groove (2) minimal thermal damage to the walls on both sides of the scribed groove, to areas adjacent to the scribed groove, and to the layer at the bottom of the scribed groove, (3) near vertical walls on both sides of the scribed groove. As well as the laser, the materials processing system includes means to focus, image and scan the laser beam in a pattern across the thin film material so as to perform the scribing process, means to adjust the overlap of the scanned laser spot, and one or more computers to control the process.

Numerous benefits are achieved using the present invention over conventional techniques. For example, in an embodiment according to the present invention, high power, pulsed lasers suitable for laser scribing of thin film materials are provided that utilize a compact architecture that is inexpensive in comparison to lasers with comparable performance characteristics. Furthermore, in an embodiment according to the present invention, pulsed lasers suitable for laser scribing of thin film materials are provided such that the optical pulses can be shaped to optimize the laser pulse profile for the scribing of thin film materials. Depending upon the embodiment, numerous benefits exist including, for example, improvements in quality and yield of the processed items. These and other benefits have been described throughout the present specification and more particularly below. Various additional objects, features and advantages of the present invention can be more fully appreciated with reference to the detailed description and accompanying drawings that follow.

DETAILED DESCRIPTION OF SPECIFIC EMBODIMENTS

In the manufacturing process of devices such as solar cells, flat panel displays, and digital displays, a design often includes a thin film of materials deposited on a substrate part of which film must be segmented by scribing a grooved line or pattern in the material, thereby segmenting or patterning the material. This pattern may be a simple line or a more complex pattern of rectangles or other shapes as required in the design of the device. Scribing a line using a pulsed laser is a multiple pulse process using a series of many laser pulses whereby each pulse is focused or imaged to a spot on the thin film and the spot is scanned along the desired line to be scribed such that there is some overlap between each spot with the previous spot and the following spot. The width of the scribed line is determined primarily by the size of the focused laser spot. Widths of lines laser scribed in such thin films typically range from 10 μm to 100 μm although narrower or wider lines can be achieved. A certain amount of spot overlap is used to adequately remove the material to leave a sharp-edged line on the substrate. Thus, the scribing process is essentially a multiple pulse process rather than a single pulse process. In some cases, the amount of overlap from pulse to pulse can be used to control the scribing process. In one example the pulse overlap is 30% although that value can vary from as low as 2% to as much as 95% depending on the properties of the material being processed.

Figure 4:
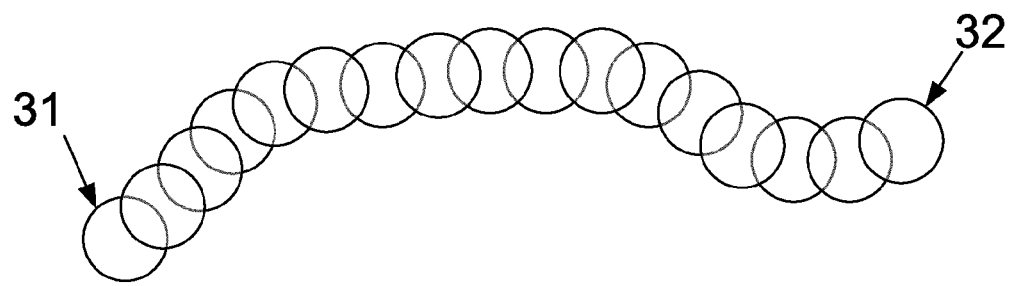
FIG. 4 is a schematic diagram showing the top view of the laser scribing process using multiple laser pulses such that the processed area of each pulse overlaps the area processed by the previous pulse and also the next pulse.

A schematic representation of laser scribing of a thin film is shown in FIG. 4. Laser scribing of thin films is a multiple pulse process requiring a series of laser pulses including in most cases at least 10 pulses. Each pulse is focused or imaged to a spot at the thin film material. The first pulse 31 in the series is directed so that the first spot is at the start position of the line to be scribed. Each subsequent pulse in the series is directed to a spot which is adjacent to the previous spot but with some overlap value OL % between 2% and 95%. The value of spot overlap shown in FIG. 4 is about 30%. Thus, each pulse in the series of pulses is directed to a position along the line to be scribed and the final pulse 32 is directed so that the spot from the final pulse is at the end of the line to be scribed. If N is the number of pulses in the burst, D is the diameter of the focused spot at the thin film, and OL % is the overlap value in percent, then the length L of the line which is scribed is given by the formula:

$$L = DN - D(N-1)(OL\%)/100$$

The width of the scribed line is a function of the focused spot size, the spot overlap, and the interaction with the thin film; ideally, the width of the scribed line is approximately the same as the diameter of the focused spot. The choice of spot overlap is a processing parameter which is changed to optimize the process. For thinner materials, it is often possible to use a very low spot overlap such as 10% which provides a fast scribing speed up to 1 msec or faster for example. For thicker materials, a larger overlap is often chosen so that the thin film material is removed completely.

Figure 5A:
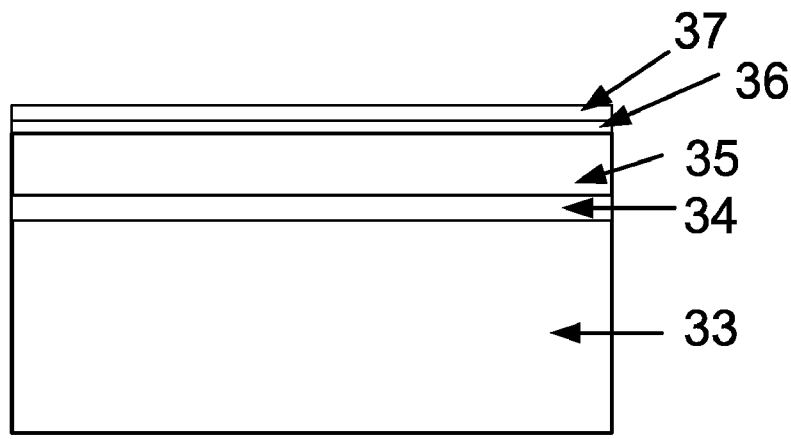
FIG. 5A is a schematic diagram showing a cross sectional side view of a photovoltaic thin film design on a substrate before the scribing process.

FIG. 5A is a schematic diagram showing a cross sectional side view of a typical photovoltaic thin film design on a substrate 33 before the top surface scribing process. In this embodiment, the thin film consists of multiples layers as follows: molybdenum layer 34, CIGS (copper indium gallium diselenide) layer 35, cadmium sulfide layer 36 and TCO (transparent conducting oxide) layer 37. The thickness of each layer in this embodiment is molybdenum 0.3 μm, CIGS 1.6 μm, cadmium sulfide less than 0.1 μm, and TCO 0.2 μm. This is but one specific example of a design according to an embodiment of the present invention. Other materials than CIGS such as for example copper indium diselenide or silver indium gallium diselenide or silver indium diselenide may also be used. Other materials than cadmium sulfide such as for example cadmium telluride may also be used. Various TCO materials such as indium tin oxide (ITO), zinc oxide, and oxides of other metals can be used. Likewise, other materials than molybdenum such as gold may be used. Embodiments of the present invention are not restricted in application to only those materials listed. The principles described in this application can be applied to a wide variety of thin film designs and materials. There are many viable substrates: metallic films or foils are suitable. An inert material such as glass or fused silica is also suitable. The choice of viable substrates is not limited to these however. Furthermore, the number of layers in the thin film need not be limited to four, but can range from a single layer up to as many as 20 or more layers. As well, the thickness of each layer is not limited to the example provided.

Figure 3:
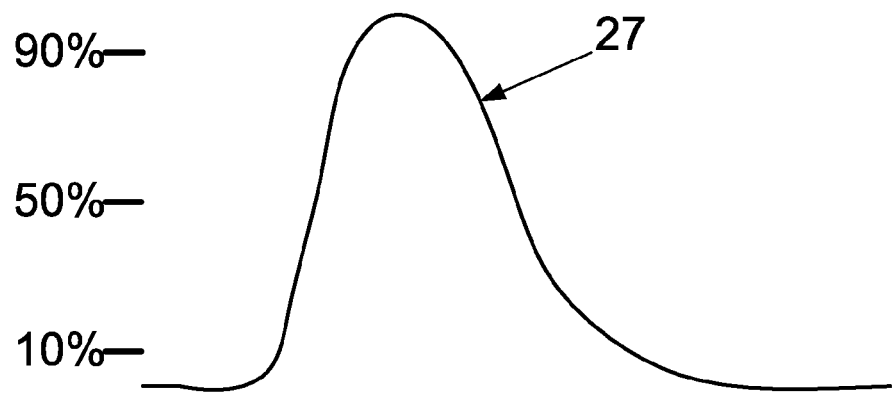
FIG. 3 is a schematic diagram showing a temporal pulse shape for conventional laser pulses used for scribing thin film materials on a substrate. In this figure, time increases left to right along the horizontal axis and power is along the vertical axis.
Figure 5B:
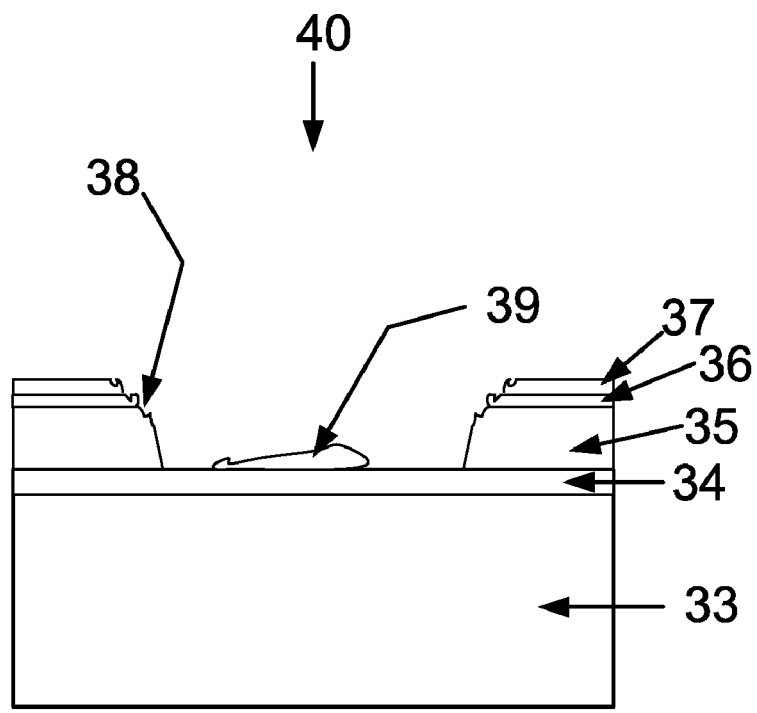
FIG. 5b is a schematic diagram of a cross sectional side view of the structure shown in FIG. 5A with a groove scribed using a laser with a conventional pulse shape.

FIG. 5B is a schematic diagram of a cross sectional side view of the embodiment of FIG. 5A with a groove 40 scribed using a laser with a conventional pulse shape of FIG. 3. Approximately 17% of the pulse energy is contained in the tail of the pulse defined as that portion of the pulse coming after the trailing edge has fallen below 50% maximum power. Also shown in FIG. 5B is a significant amount of CIGS residue 39 remaining in the scribed groove, as well as damage 38 to the side walls and adjacent areas of the groove. Such residue and thermal damage to adjacent areas is frequently the result of scribing a thin film material using a laser with a conventional pulse shape. One cause of this unacceptable scribe quality using a conventional Q-switched laser pulse is the large amount of energy present in the tail of the conventional laser pulse shape and thus the inability to impart the majority of the total energy contained in the laser pulse during a short enough time period. Embodiments of the present invention provide a method and an apparatus to improve the quality of thin film scribing by reducing or eliminating residue in the scribed groove, and reducing or eliminating thermal damage to walls and other areas adjacent to the scribed groove.

Figure 5C:
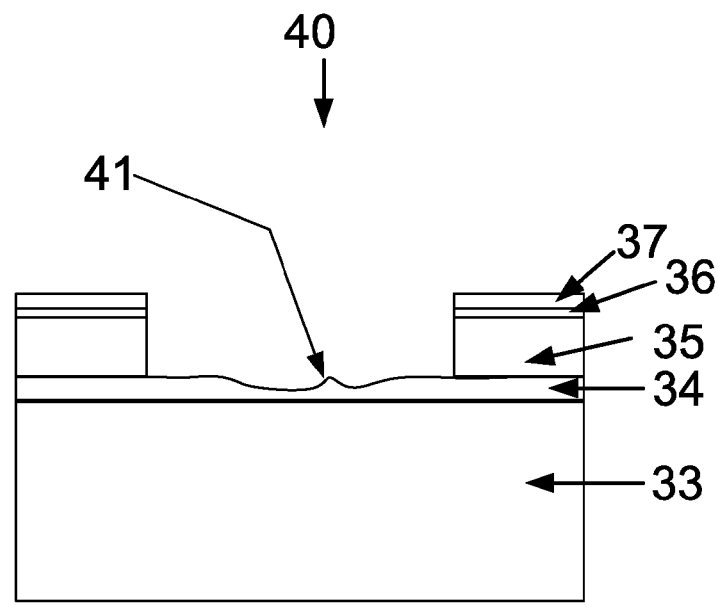
FIG. 5C is a schematic diagram of a cross sectional side view of the structure shown in FIG. 5A with a groove scribed using a laser with a conventional pulse shape.

FIG. 5C is a schematic diagram of a cross sectional side view of the embodiment of FIG. 5A with a groove 40 scribed using a laser with a conventional pulse shape of FIG. 3 where the pulse length full width at 10% maximum power is about 100 fs. Lasers with very short pulse lengths in the femtosecond regime are frequently used to ablate materials by virtue of an extremely high peak power deposition of energy in the material. These lasers have a disadvantage that they are expensive and very complex for use in a manufacturing environment. As well, there is sometimes a disadvantage that extremely high peak power laser pulses will also ablate material from layers of the thin film that are not supposed to be ablated even when those materials would normally be substantially reflecting for a laser pulse with lower peak power. As shown in FIG. 5C, the groove 40 scribed using a short pulse femtosecond laser with a conventional pulse shape exhibits a significant amount of material removed 41 from the molybdenum layer. Material removal or damage to the underlying layers of the scribed groove is an undesirable outcome. It is a further object of this invention to provide a method and apparatus to improve the quality of thin film scribing by reducing or eliminating any damage or material removal to underlying layers of the scribed groove.

Figure 5D:
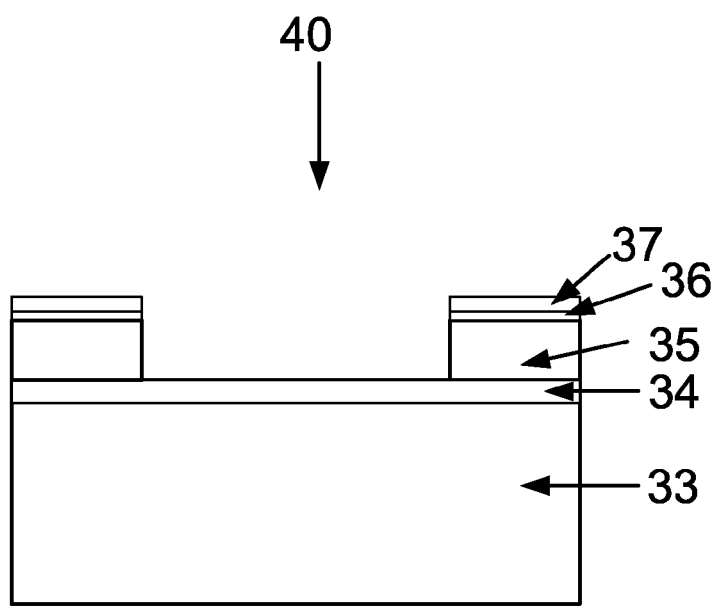
FIG. 5D is a schematic diagram of a cross sectional side view of the structure shown in FIG. 5A with a groove scribed using a laser with a predetermined pulse shape according to an embodiment of the present invention.

FIG. 5D is a schematic diagram of a cross sectional side view of the embodiment of FIG. 5A with a groove 40 scribed using a series of laser pulses with a predetermined pulse shape according to an embodiment of the present invention. As shown in FIG. 5D, the groove scribed using a series of laser pulses with a predetermined pulse shape exhibits minimal or no CIGS residue in the groove, minimal or no damage to the walls of the groove or adjacent area, minimal or no damage to the underlying molybdenum layer, and a groove with near vertical side walls.

Figure 1:
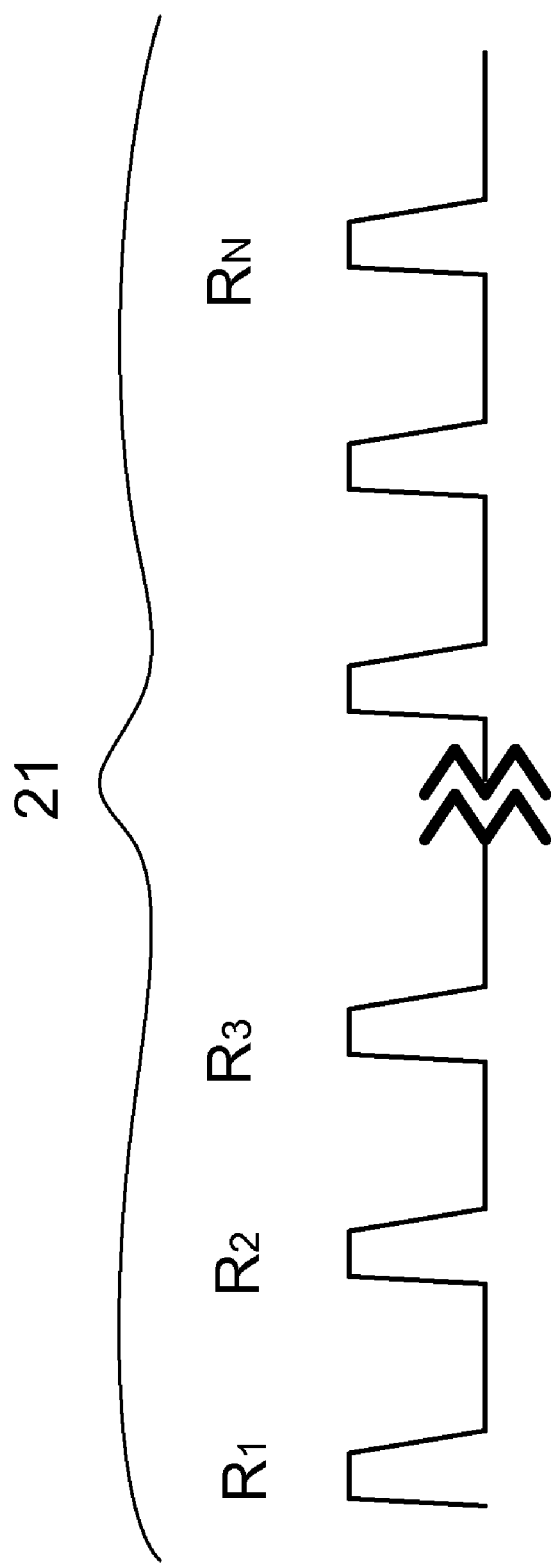
FIG. 1 is a schematic diagram of an embodiment showing a series of pulses, with a predetermined pulse shape of the flat-top pulse format, suitable for scribing a line in a thin film material on a substrate. In this figure, time increases left to right along the horizontal axis and power is along the vertical axis.
Figure 2A:
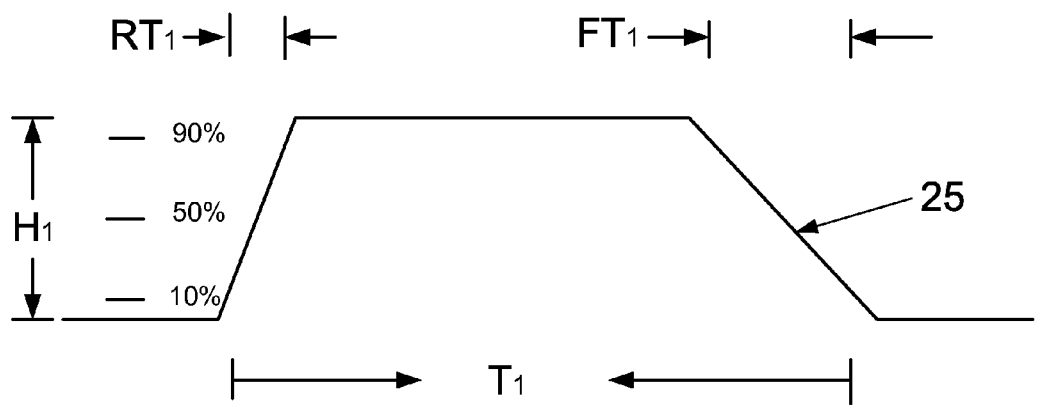
FIG. 2A a shows a flat-topped pulse according to an embodiment of the present invention, where time increases left to right along the horizontal axis and power is along the vertical axis.
Figure 2B:
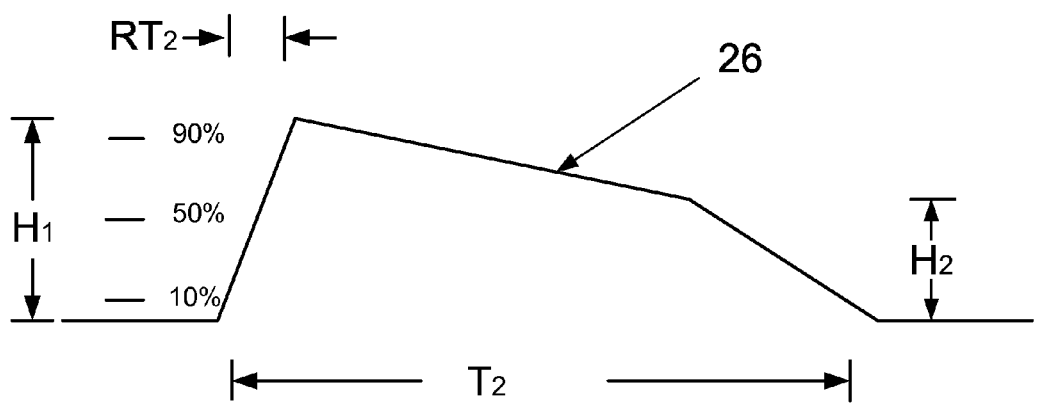
FIG. 2B shows a pulse with power droop according to another embodiment of the present invention where time increases left to right along the horizontal axis and power is along the vertical axis.

FIG. 1 shows a series of pulses 21 where each pulse has a predetermined pulse shape according to an embodiment of the invention that has improved the quality of scribing a line in a thin film on a substrate compared to the lesser quality obtained using series of laser pulses with a conventional pulse shape shown in FIG. 3. Each series typically contains at least 10 pulses although this is not a requirement of the present invention. In particular, FIG. 2A shows a predetermined pulse shape 25 according to one embodiment of the present invention with a pulse length full width at 10% maximum power of T1, front edge risetime (10% to 90%) of RT1, and a back edge falltime (90% to 10%) of FT1. The peak power of the flat top is H1. For a predetermined pulse shape according to the present invention, T1 will preferably fall within the range 1 ns to 10 ns. In some embodiments, risetime is faster than 10% of T1 and falltime is faster than 30% of T1 although even faster values are also included within the scope of the present invention. In general, the choice of pulse energy will depend on a number of factors including the materials being processed, the size of the laser spot, and the width of the line being scribed. In the example illustrated in FIG. 5D a value of pulse energy between 5 to 10 μJ is utilized. Compared to the lines scribed using bursts of pulses with conventional pulse shape, which showed significant CIGS residue and damage to adjacent areas and layers as shown in FIG. 5B and FIG. 5C, the lines scribed using a series of pulses of the flat top pulse shape of FIG. 2A provide a groove with near vertical side walls with no damage evident in the walls or adjacent areas, no removal or damage to the underlying molybdenum layer, and only trace amounts of CIGS residue, as shown schematically in FIG. 5D. In one embodiment of the invention, lines of width 47 μm were scribed in a thin film sample of the design shown in FIG. 5A where the layers were constituted as follows: 25 μm thickness metal foil substrate 33, 0.3 μm thickness molybdenum layer 34, 1.6 µm thickness CIGS (copper indium gallium diselenide) layer 35, less than 0.1 µm thickness cadmium sulfide layer 36, and 0.2 µm thickness TCO top layer 37. In this embodiment, a series of pulses from a laser of wavelength 1064 nm with a predetermined pulse shape of FIG. 2A with pulse energy of 10 µJ, a pulse length T1 (full width at 10% maximum power) of 5 ns, values of RT1 and FT1 of 0.3 ns, repetition rate 20 KHz, were imaged at the thin film with a spot size of 47 µm where the stage moved with a speed of approximately 0.85 m/s to provide a spot overlap along the line pattern to be scribed of approximately 10%. The resultant groove scribed in the thin film material down to the molybdenum layer exhibited near vertical side walls with no thermal damage evident in the walls or adjacent areas, only trace amounts of CIGS residue in the groove, and no damage to the underlying molybdenum layer. Various other stage speeds and laser repetition rates were used to change the spot overlap from 2% up to 50% and the resultant groove in the thin film material exhibited similar advantageous properties with near vertical side walls with no damage evident in the walls or adjacent areas with only trace amounts of CIGS residue in the groove, and with no damage to the underlying molybdenum layer. Similar advantageous results were observed when using a series of laser pulse with predetermined flat top pulse shape with pulse length T1 of 2 ns, values of RT1 and FT1 both less than 0.5 ns, pulse energy 5 µJ and imaged to a spot size of 36 µm where a line is scribed using a stage speed and laser repetition rate to provide a spot overlap between 2% and 50%. Similar advantageous results were also observed when using a series of laser pulses with a predetermined flat top pulse shape with pulse length T1 of 10 ns, values of RT1 and FT1 both less than 1 ns, pulse energy 10 µJ and imaged to a spot size of 41 µm where a line is scribed using a stage speed and laser repetition rate to provide a spot overlap between 2% and 50%. The specific parameters of embodiments of the present invention are not restricted to these values. In an embodiment, the pulse length T1 of the flat top pulse would be between 1 ns and 10 ns. The risetime RT1 of the flat top pulse would be faster than the lesser of 6 ns or the pulse length T1. The falltime FT1 would be faster than the lesser of the pulse length T1 or 2 ns. Similar improvements are achieved in some embodiments in which the flat top pulse shape exhibits some droop as shown in FIG. 2B. As an example, the droop can be such that (H1−H2) is less than 50% of H1, where T2 (full width at 10% maximum power) was in the range of 1 ns to 10 ns, RT2 was faster than the lesser of 6 ns or T2, and FT2 was faster than the lesser of 2 ns or T2.

Figure 12:
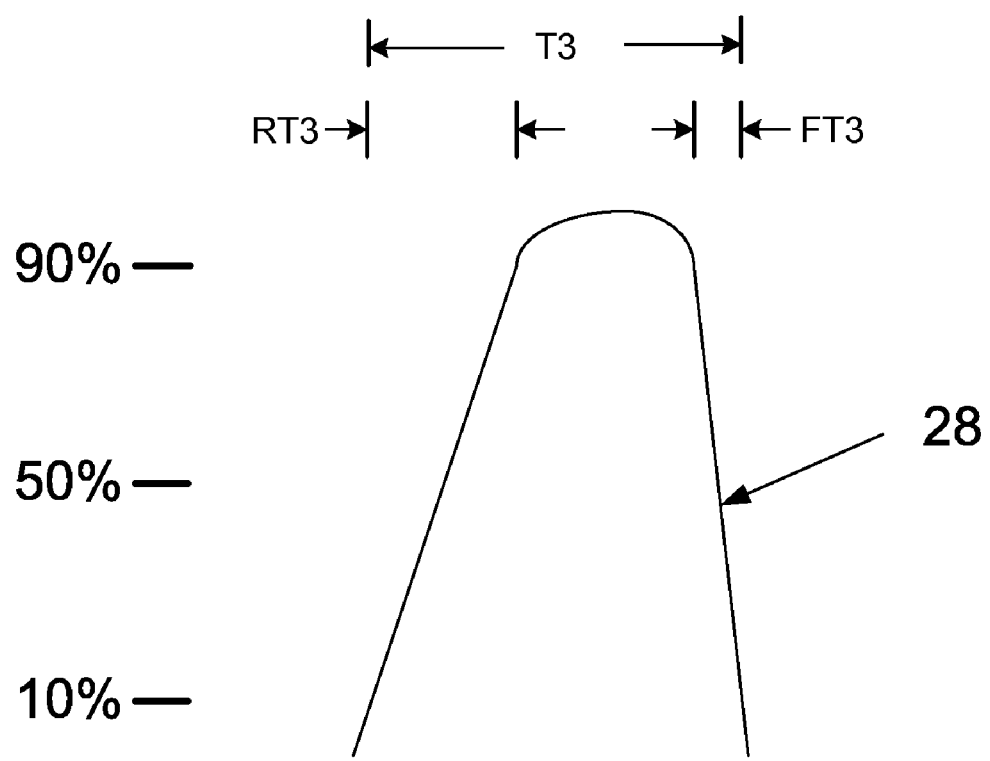
FIG. 12 shows a pulse shape according to an embodiment of the present invention where time increases left to right along the horizontal axis and power is along the vertical axis.

There are a range of pulse parameters wherein the advantages of the predetermined pulse shape according to embodiments of this invention will scribe a line in a thin film which exhibits similar advantageous properties of a groove with near vertical side walls with no damage evident in the walls or adjacent areas with only trace amounts of CIGS residue in the groove, and with no damage to the underlying molybdenum layer. Embodiments of the present invention utilize a predetermined laser pulse designed to provide the majority of the pulse energy to the process within 5 ns and typically no longer than 10 ns, and also such that very little energy is provided in a tail after that time period because it can have deleterious effects on the quality of the thin film scribing process. Although a fast pulse risetime is preferred, for many materials, pulses with a risetime as long as 6 ns will provide similar advantages as long as the majority of the pulse energy is provided in a time period less than 10 ns. Likewise, the shape of the pulse need not be horizontal and flat-topped, but could be flat and tapered, or have a rounded top. Thus, for a predetermined pulse shape with a pulse length full width at 10% maximum power according to an embodiment of this invention, preferably less than 5% of the total pulse energy will be contained in the portion of the pulse coming later in time than the half power point of the pulse trailing edge. Typically less than 10% of the energy would be contained therein. A suitable predetermined pulse shape according to an embodiment of this invention is shown in FIG. 12. This pulse shape has a risetime (10% to 90% power points) of less than 6 ns, a pulse width full width at 10% maximum power less than 10 ns, and percentage of less than 10% of the total pulse energy in the tail after the trailing edge has fallen below the half peak power point. Preferably, the risetime of the predetermined pulse would be less than 1 ns, the pulse width would be less than 5 ns, and the percentage of energy contained in the tail would be less than 2% of the total pulse energy.

Similar improvements are achieved using different values of spot size. In the example described earlier, the energy density achieved for a pulse of energy 10 µl imaged to a 47 µm spot is 0.65 J/cm². In one application, the pulse length T1 for the flat top pulse in the series of pulses was within the range 1 ns to 10 ns and the energy density was within the range 0.2 to 0.7 J/cm² for laser scribing a thin film sample. Thus, for example, a series of pulses from a laser of wavelength 1064 nm with a predetermined pulse shape of FIG. 2A with pulse energy of 40 µJ, a pulse length T1 (full width at 10% maximum power) of 5 ns, values of RT1 and FT1 of 0.2 ns, repetition rate 20 KHz, and imaged at the thin film with a spot size of 94 µm with a spot overlap along the line pattern to be scribed of approximately 10% where the stage moved with a speed of approximately 1.7 m/s would result in a scribed groove in the thin film material such that the groove exhibited near vertical side walls with no damage evident in the walls or adjacent areas with only trace amounts of CIGS residue in the groove, and with no damage to the underlying molybdenum layer.

It may be useful to adjust the energy density when using small spot sizes. In the example described earlier, the energy density achieved for a 10 µJ imaged to a 47 µm spot is 0.65 J/cm2. In an application, the pulse length T1 for the flat top pulse in the series of pulses was within the range 1 ns to 10 ns and advantageous results in laser scribing were obtained when the laser spot size was reduced to 20 µm diameter using an energy density between 0.4 J/cm² and 1.4 J/cm². The choice of energy density may depend on the width of the line to be scribed.

The choice of energy density may depend on the choice and composition of materials used in the thin film. For example, CIGS is a solid solution of its constituent materials where the percentages of indium and gallium can be chosen to have specific values. The specific choice of these values will typically have an effect on the energy density and other process parameters when scribing a line in that particular thin film using a particular laser wavelength. The choice of optimal energy density for a particular sample is often done using a series of tests prior to the actual scribing process after which an optimal pulse energy may be chosen.

For very thin films, a small overlap can be used to remove the material at each focused spot, but as the thickness of the material increases, it can be preferable to increase the spot overlap rather than increase the pulse energy. Low spot overlap can lead to more modulation in the edge of the scribed line where the spots overlap than in the edges of the scribed line if the spot overlap is high. However, this sharp point at the edge of each spot overlap is not the same as thermal damage which may result at the edge of the scribed groove in the thin film if a series of laser pulses with conventional pulse shape is used. Therefore, in one embodiment, the sharp edge where spots overlap is reduced without affecting the formation of CIGS residue or thermal damage to the walls or surrounding areas of the groove scribed by a series of pulses with a predetermined pulse shape by increasing the spot overlap. In an embodiment of the invention, the spot overlap is chosen to be 30% but the value of spot overlap chosen need not be 30% but can be as low as 10% or as high as 70%.

The present invention is not restricted to layers of material with thicknesses as described herein. For example, for a CIGS layer of thickness 2 μm rather than 1.6 μm described earlier, the pulse energy would be expected to increase somewhat. Similarly, for a thinner layer, the pulse energy required would be somewhat reduced while maintaining the same pulse length T1 of 5 ns with the predetermined pulse shape.

Various variations and combinations of parameters used in the embodiments described in this disclosure are provided. For example, different values of spot overlap ranging between 10% and 70% with concomitant changes in spot size, energy density and stage speed would result in the same advantageous properties of the laser scribed groove or pattern in the thin film substrate. Optical homogenizers designed to change the spatial profile of the energy distribution in a laser pulse imaged at the thin film material from a Gaussian form to a flat top or other desirable profile exist and can be utilized to yield advantageous results.

Various equipment can be utilized to determine the quality of the scribed line. An optical microscope with magnification 40× may be adequate to observe damage to walls and areas near the scribed line as well as CIGS residue in the groove for the case of scribing using a conventional pulse shape. When using a predetermined pulse shape, no CIGS residue is evident in the groove when inspected using an optical microscope. This result will be referred to herein as "no observable residue". Similarly, for the case where a predetermined pulse shape is used according to the present invention, the walls of the groove appear vertical when observed using an optical microscope with magnification 40×. More sensitive equipment such as an interferometric surface profiler or a scanning electron microscope SEM can also be used to further examine grooves scribed using a laser with a predetermined pulse shape. Using a SEM, some few CIGS particles can still be detected on the floor of the scribed groove and this will be described as "trace." This level of CIGS residue is much less than can be observed with an optical microscope and also well below that which would cause problems in manufacturing. Also using the SEM, an estimate can be made of the slope of the side walls of the scribed groove. In some embodiments, vertical side walls have a wall width (10% height to 90% height) less than 1 μm for more than 80% of measurements at random locations on the wall. A further common measurement to ascertain the quality of the scribed groove is to measure the electrical resistance from the top layer on one side of the groove to the top layer on the other side of the groove. A typical acceptable value for resistance for a groove scribed in this layer system is greater than 200 ohms although this will also depend on the length of the scribe.

Without restricting the scope of the present invention, the inventors believe an explanation of this ability to cleanly scribe lines in a thin film material using a first surface process with laser pulses of a predetermined pulse length and pulse shape is a process of brittle fracture. For certain materials including materials used in thin films and including particularly CIGS and copper indium diselenide, a process of brittle fracture could explain how laser pulses used under certain specific conditions will cleanly remove certain thin film materials without damage to nearby materials. In such materials, a suitable laser pulse can be made to penetrate substantially to the underlying metallic layer and to rapidly heat the materials at and near that local spot to a high temperature that is just below the temperature at which the material melts or substantially softens. At that elevated local temperature, there is a significant buildup of gas vapor pressure at the molybdenum CIGS interface and also significant differential thermal expansion between the CIGS layer and the underlying molybdenum layer thereby providing sufficient stress to initiate fracturing around the outside of the spot, and the explosive expulsion of the CIGS from the surface of the molybdenum. In the case of a thin film incorporating CIGS, the inventors believe that selenium vapor is the most likely source of the gas pressure since selenium has the lowest boiling point of the CIGS constituents. This mechanism will generally be observed in materials which exhibit the appropriate mechanical properties. The inventors believe that this process with the clean ejection of the fragments can be achieved in materials such as CIGS or copper indium diselenide using appropriate wavelength lasers with an effective energy deposition time of less than 10 ns, and with an appropriate predetermined pulse shape which acts to quickly and directly deposit enough energy at or near the appropriate thin film layer interface to cause vapor generation, differential thermal expansion, and subsequent delamination from the underlying layer (e.g., molybdenum) while also preventing any substantial melting of the material or thermal conduction to nearby areas to occur. Embodiments of the present invention utilize the short pulse length of the laser pulse to deposit sufficient energy very quickly at the desired location in the layer structure, and the fast fall time of the laser pulse to prevent any excess energy becoming available for conduction from the molybdenum into nearby areas or for absorption directly by the CIGS material.

Further, the optical properties of the layer(s) being expelled (e.g., CIGS) are considered by some embodiments. In an embodiment, in order for the laser energy to reach the bottom layer 34 in FIG. 5A (e.g., molybdenum), the overlying layers 35, 36, 37 are sufficiently transparent at the laser wavelength being used. If these layers are absorbing, excess energy may be absorbed directly by them. During the process, the correct amount of energy is deposited to cause sufficient buildup of gas pressure and differential thermal expansion without the onset of melting. Melting of the CIGS would likely serve to relieve the built up stress and also allow the gas vapor to escape without resulting in the desired explosive delamination process and the clean scribed line. As an example of controlled energy deposition, for the situation described earlier of 10 μJ in a pulse with pulse length T1 of 5 ns deposited in a spot of diameter 47 μm, some of the energy transmitted through the CIGS layer will be reflected by the molybdenum layer or else conducted back to the CIGS layer as heat after being absorbed by the molybdenum layer. Thus, the energy density of the laser radiation at the surface of the thin film is 0.6 J/cm$^2$. It should be emphasized that the deposition of energy and the rise in temperature of the material during the laser pulse is not uniform but is instead located primarily at or near the interface between the molybdenum layer and the CIGS layer. For energy deposition in this range over a time period of 5 ns, no CIGS melting occurs but the CIGS does fracture and explosively delaminate from the molybdenum layer taking with it the layers above in a clean process. Little heat remains behind and no more energy is being deposited by the laser pulse so thermal damage to the surrounding area is minimized. Rapid deposition of the appropriate amount of energy to cause delamination of the CIGS layer is the key to a clean scribing process.

A similar analysis of an embodiment described earlier of controlled energy deposition in CIGS using a T1=2 ns laser pulse of predetermined pulse shape with pulse energy 5 µJ imaged to a spot size of 36 µm provides the following data: the energy density of the laser radiation at the surface is 0.5 J/cm$^2$. For energy deposition in this range over a time period of 2 ns, no CIGS melting occurs but the CIGS does fracture and delaminate from the molybdenum layer taking with it the layers above in a clean process. Not enough heat remains behind and no more energy is being deposited by the laser pulse so thermal damage to the surrounding area is minimized. Rapid deposition of the appropriate amount of energy to cause delamination and explosive expulsion of the CIGS layer is the key to a clean scribing process.

Although the value of absorption of the CIGS material may be as high as 80%, lower absorption is also suitable for embodiments of the present invention. The absorption of the CIGS layer may be substantially less than 80%. Since the mechanism is believed to involve removing the thin film without melting the thin film but rather through a delamination process at the molybdenum interface, it is preferable that sufficient laser light can penetrate substantially through the CIGS layer and be partially absorbed at or near the surface of the molybdenum adjacent to the CIGS layer. Heating of the CIGS region adjacent to the molybdenum surface by conduction causes the temperature of that region of the CIGS material to increase rapidly while the remainder of the CIGS material does not heat as rapidly. The brittle fracture of the CIGS from the underlying molybdenum layer is believed to occur through a process of stress induced by differential expansion and by vapor pressure from the emission of selenium gas from the hot CIGS material near the molybdenum interface leading to explosive expulsion. There is evidence that the thin film layer including the CIGS is removed as a bubble, and in fact the cap for some pulses can be seen nearby in several large fragments or even the whole cap in some cases. This differentiates the process from a vaporization process or ablation process where the CIGS would disintegrate into a powder or many small fragments or even melt. The removal of the thin film is believed to be beneficial in obtaining the desired properties of the scribed line such that the groove exhibits near vertical side walls with no damage evident in the walls or adjacent areas with only trace amounts of CIGS residue in the groove, and with no damage to the underlying molybdenum layer.

To achieve the desired properties of the scribe, it is believed that the temperature of the CIGS material adjacent to the molybdenum surface must rise quickly but the temperature of the bulk of the CIGS material must not rise nearly as much. According to some embodiments, an upper limit of the laser pulse length of less than 10 ns full width at 10% maximum power and preferably less than 5 ns full width at 10% maximum power is provided. In order for a brittle fracture to occur, it is believed that the temperature of the bulk of the CIGS material cannot rise enough so that the CIGS becomes malleable or melts because this will lead to undesirable properties of the scribed groove such as melted material on the bottom of the groove and on the walls. Depending on the laser wavelength and the composition of the CIGS material, it is also probable that the absorption coefficient of CIGS will increase rapidly as a function of temperature. Thus, it is important that once the heating of the CIGS material adjacent to the molybdenum surface has been initiated during the 10 ns or less laser pulse, no more significant laser light is incident on the material since it would tend to be absorbed in the bulk of the CIGS leading to an undesirable temperature rise therein. This consideration leads to the use of pulses with a rapid falltime so that little energy is present in the tail of the pulse as described previously.

The amount of light reflected by the molybdenum surface depends on a number of factors including the physical finish of the molybdenum surface and the material in the adjacent layer. A typical reflectivity is 40% but the actual reflectivity of the molybdenum may range from as low as 10% to as high as 65%. Even though a substantial amount of the laser light may be reflected by the molybdenum, some light is also absorbed. This absorbed light serves to heat the molybdenum and the adjacent CIGS material. For molybdenum with low reflectivity and therefore stronger absorption, the temperature at or near the molybdenum surface will rise faster, which is a desirable outcome.

The expulsion of the CIGS material and the material in layers above the CIGS in the brittle fracture process is also believed to be caused by the buildup of a vapor pressure between the CIGS layer and the molybdenum layer. This vapor pressure can be extremely high, and can result in fracture of the highly stressed CIGS layer above it, and its removal by explosive force. Evidence for this has been observed in the form of CIGS fragments which can be found a distances of about 1 mm or more from the scribe line. The vapor pressure is believed to be primarily that of Selenium vapor. Selenium has the lowest boiling point of the materials comprising CIGS and the molybdenum substrate.

Figure 11A:
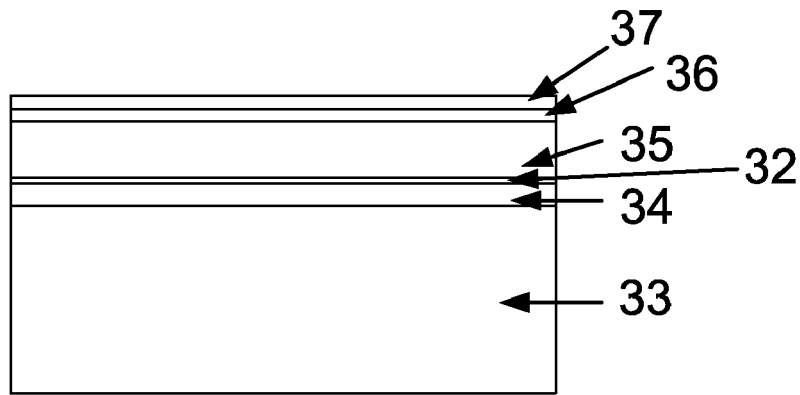
FIG. 11A is a schematic diagram showing a cross sectional side view of a photovoltaic thin film design on a substrate before the scribing process.

Another layer configuration of a thin film on a substrate which is suitable to be scribed using an embodiment of the present invention is shown in FIG. 11A. In this case, a thin layer 32 is present between the molybdenum layer 34 and the CIGS layer 35. The layer 32 may be present simply as a byproduct of the deposition process. For example, a thin layer of molybdenum diselenide less than 0.1 µm in thickness is often present as a result of the deposition process. The layer may also be intentionally deposited. Embodiments of the present invention as described herein will also be suitable to scribe a line in a thin film of the kind shown in FIG. 11A. In fact, the thin layer 32 may aid in the absorption process at or near the molybdenum surface by increasing the absorption of laser light and providing a source of selenium vapor, thereby accelerate the heating of the adjacent CIGS material and the removal of the CIGS layer by a brittle fracture process. In another embodiment, layer 32 may be a material with strong absorption which is added between the molybdenum layer and the CIGS layer with the purpose to facilitate the laser scribing process. In another embodiment, layer 32 may be a material which reduces the reflectivity of the molybdenum surface and which is add between the molybdenum layer and the CIGS layer with the purpose to facilitate the laser scribing process.

One possibility is that the selenium vapor may be evolved more readily from molybdenum diselenide than from CIGS, and that this may therefore be a source of the buildup of vapor pressure which drives an explosive ablation process.

Figure 11B:
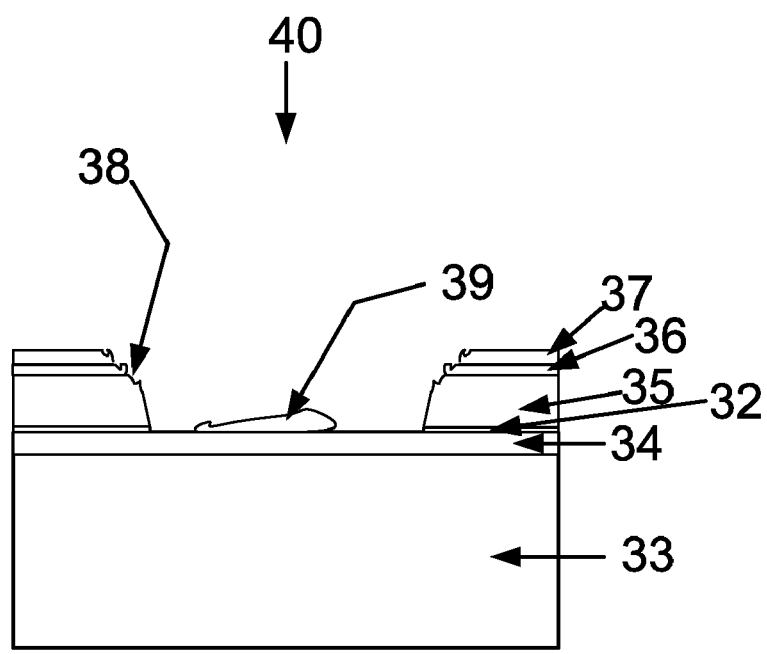
FIG. 11B is a schematic diagram of a cross sectional side view of the structure shown in FIG. 11A with a groove scribed using a laser with a conventional pulse shape.

FIG. 11B is a schematic diagram of a cross sectional side view of the embodiment of FIG. 11A with a groove 40 scribed using a laser with a conventional pulse shape of FIG. 3 where the pulse length full width at 10% maximum power is about 10 ns. Also shown in FIG. 11B is a significant amount of CIGS residue 39 remaining in the scribed groove, as well as damage 38 to the side walls and adjacent areas of the groove. Such residue and thermal damage to adjacent areas is frequently the result of scribing a thin film material using a laser with a conventional pulse shape. In this embodiment, the scribe process terminates at the molybdenum layer 34.

Figure 11C:
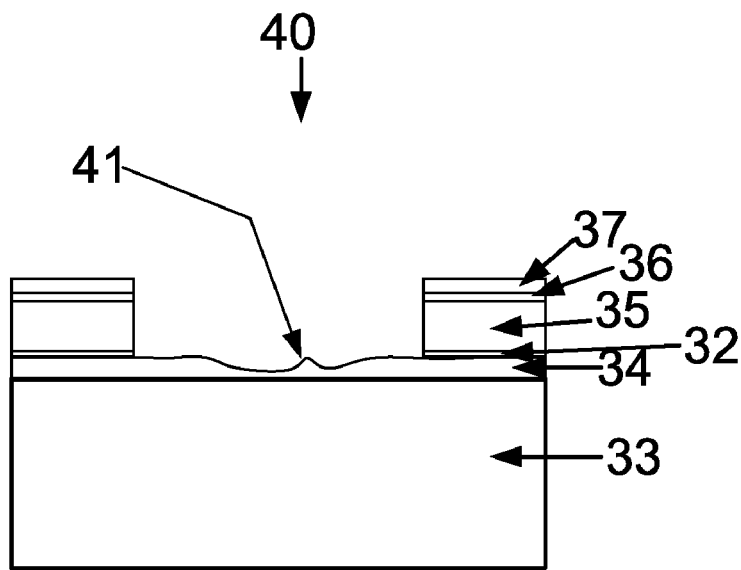
FIG. 11C is a schematic diagram of a cross sectional side view of the structure shown in FIG. 11A with a groove scribed using a laser with a conventional pulse shape.

FIG. 11C is a schematic diagram of a cross sectional side view of the embodiment of FIG. 11A with a groove 40 scribed using a laser with a conventional pulse shape of FIG. 3 where the pulse length full width at 10% maximum power is about 100 fs. As shown in FIG. 11C, the groove 40 scribed using a short pulse femtosecond laser with a conventional pulse shape exhibits a significant amount of material removed 41 from the molybdenum layer. Material removal or damage to the underlying layers of the scribed groove is an undesirable outcome.

Figure 11D:
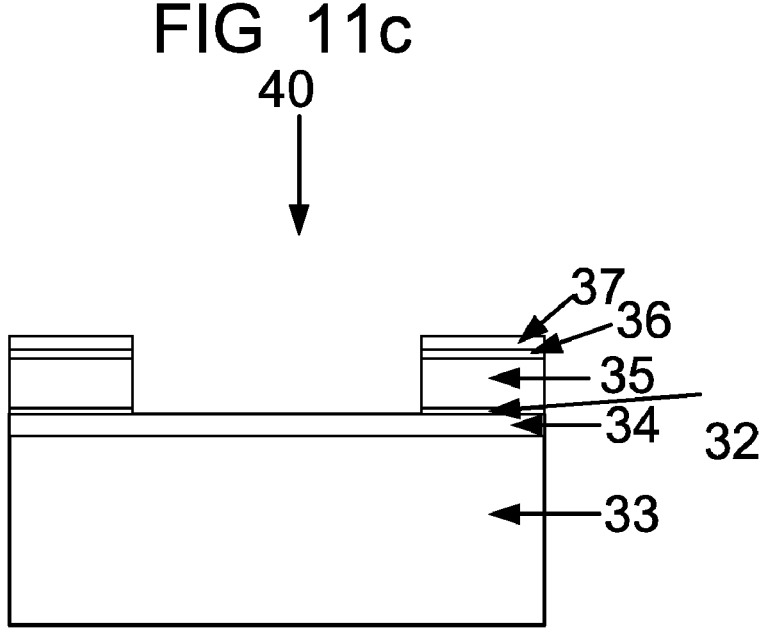
FIG. 11D is a schematic diagram of a cross sectional side view of the structure shown in FIG. 11A with a groove scribed using a laser with a predetermined pulse shape according to an embodiment of the present invention.

FIG. 11D is a schematic diagram of a cross sectional side view of the embodiment of FIG. 11A with a groove 40 scribed using a series of laser pulses with a predetermined pulse shape according to an embodiment of the present invention. As shown in FIG. 11D, the groove scribed using a series of laser pulses with a predetermined pulse shape exhibits minimal or no CIGS residue in the groove, minimal or no damage to the walls of the groove or adjacent area, no damage to the underlying molybdenum layer, and a groove with near vertical side walls. The application of embodiments of this invention is suitable for other layer designs of thin films and is not restricted only to thin films of the design shown in FIGS. 5A and 11A.

The application of embodiments of this invention is not restricted to thin films containing a layer of CIGS. The use of a predetermined pulse shape according to embodiments disclosed in this invention will be of benefit in scribing thin films of other materials. For example, copper indium diselenide is another material that can be cleanly removed using the laser scribing process with predetermined pulse shape as described in this invention although the appropriate values of energy deposition per unit volume may not be exactly the same as CIGS. The use of predetermined pulse shapes in this application will benefit from the use of wavelengths other than 1064 nm as appropriate for the thin film material to be scribed. The choice of laser wavelength is determined in part by the absorption of the material to be scribed as well as the materials used in the layer(s) above and below. As well as 1064 nm, lasers are available at other wavelengths including 1032 nm, 1.3 microns, 1.5 microns, 2 microns and others. In addition, it is possible to achieve other wavelengths as required using nonlinear processes such as phase matched mixing to achieve longer wavelengths. In some cases, it may be advantageous to use a wavelength other than 1064 nm such as longer wavelengths where the CIGS material is more transparent.

Without restricting the scope of the invention, the inventors have determined a guideline for the choice of laser wavelength: namely, that the laser wavelength should be longer than the effective bandgap energy wavelength of the majority material comprising the thin film to be scribed, where the bandgap energy wavelength is given by the following formula:

(Bandgap energy wavelength)=$hc$/(bandgap energy)

where h is Planck's constant and c is the speed of light. This guideline effectively states that the photon energy of the laser should be less than the bandgap energy. The bandgap energy of a semiconductor is a parameter well known to those persons skilled in the art and defined as the gap in energy between electrons present in the upper edge of the valence band and in the lower edge of the conduction band. The band gap energy is usually given in units of ev (electron volts). A similar definition exists for the band gap of an insulator although the band gap energy of an insulator is much larger than the band gap energy of a semiconductor. As an example, for the embodiment described earlier where CIGS (cadmium indium gallium diselenide) is the majority component of a thin film, CIGS is a semiconductor with a band gap. In fact, CIGS material is a solid solution of copper indium selenide and copper gallium selenide, with a chemical formula of Cu[In$_x$Ga$_{(1-x)}$]Se$_2$, where the value of x can vary from x=1 (pure copper indium selenide) to x=0 (pure copper gallium selenide). Likewise, the semiconductor band gap of CIGS can vary between 1 eV for pure copper indium selenide (x=1) and 1.7 eV for pure copper gallium selenide (x=0). In the embodiment described earlier, the measured band gap for the CIGS material was 1.2 eV, which corresponds to an equivalent band gap energy wavelength of 1033 nm. Hence, the chosen laser wavelength of 1064 nm was longer than the bandgap energy wavelength 1033 nm (the laser photon energy was less than the band gap energy). CIGS material with a bandgap of 1.2 eV is considered by many experts in the field to be an optimum CIGS composition for photovoltaic applications. In the case where the band gap of the majority component of the thin film to be scribed is not known or can vary depending on the composition of the material or the manufacturing process, it is useful to measure the bandgap so that the laser wavelength can be chosen appropriately. Although the inventors believe that a laser wavelength chosen using the guideline described herein may provide a larger operating window to achieve a clean scribing process when used in combination with an optimal pulse energy and a predetermined temporal pulse shape, the choice of a laser wavelength longer than the equivalent bandgap energy wavelength of the majority component of the thin film to be scribed may not be an essential ingredient to achieve a clean scribing process of a thin film in all embodiments.

Although laser scribing of thin films has been used in the manufacture of electronic devices, there have been a number of problems when using commercially-available lasers. These problems can be categorized as (1) unintended damage to nearby areas, and (2) incomplete removal of material. Such lasers can be reliable and cost effective but typically provide pulses with the conventional pulse shape. A recent addition to the type of laser used to scribe thin films has been lasers with very short pulse lengths so that energy can be deposited in a time scale of picoseconds or even femtoseconds. This approach has been successful except for two factors: (1) short pulse lasers are very expensive and complex, and (2) short pulse lasers can sometimes damage underlying layers or nearby areas simply because of the extremely high peak power of these lasers. Thus, lasers which are reliable and cost effective but also capable of generating pulses with a predetermined pulse shape for laser scribing of materials such as CIGS are sought.

Figure 6:
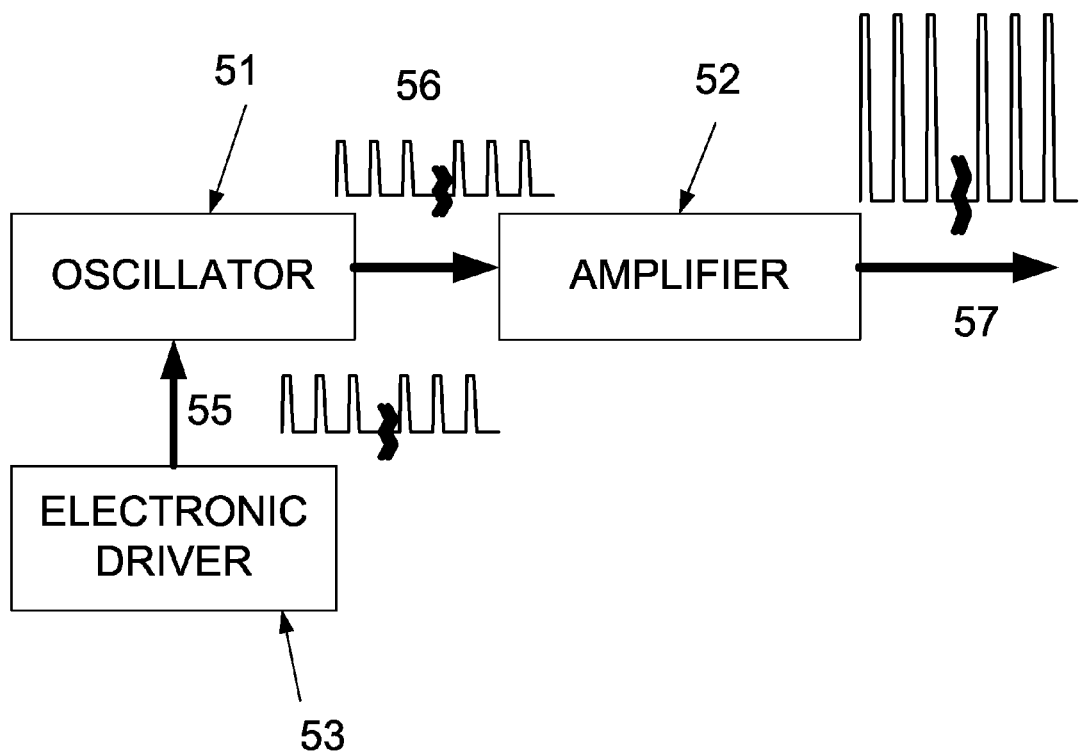
FIG. 6 is a simplified schematic illustration of a pulsed laser with tunable pulse characteristics providing an output series of laser pulses with a predetermined pulse shape according to an embodiment of the present invention.

With reference to FIG. 6, a laser system capable of generating predetermined pulse shapes of the kind disclosed in this application is shown. This laser system includes an oscillator 51, powered by an electronic driver 53, and includes an amplifier 52. Pulsed laser sources such as diode lasers can be pulsed in a simple manner by providing a pulsed electronic drive signal. The pulse shape of each optical laser pulse in a series 56 of pulses that is generated can be pre-determined by choosing the shape of the electronic drive signal 55 sent to the oscillator 51 by the electronic driver 53. The shaped signal from such a pulsed laser oscillator is then amplified in a laser amplifier such as a diode-pumped solid state rod laser or a fiber laser amplifier in such a manner that the pulse shape of each pulse in a series 57 of output pulses is maintained substantially unchanged from that pulse shape provided by the oscillator.

The oscillator laser may consist of a semiconductor laser, a fiber laser, a diode laser, or a distributed feedback diode laser. In a particular embodiment, the pulsed signal source is a semiconductor diode laser operating at a wavelength of 1064 nm with a one watt peak pulse power, a repetition rate variable up to 200 KHz (kilohertz), a pulse width of 5 nanoseconds with a sub-nanosecond pulse risetime and falltime. In alternate embodiments, the peak optical power of the pulsed signal source can be lower or higher than one watt. For example, it can be 500 mW, 1 Watt, 2 Watts, 3 Watts, 4 Watts, 5 Watts or more. Also, the pulse width can be smaller or larger than 100 nanoseconds. For example, it can be 1 ns (nanosecond), 2 ns, 5 ns, 10 ns, 15 ns, 20 ns, and other values. The oscillator laser is driven by an electronic driver such that the shape of the current pulse provided by the electronic driver is mimicked by the shape of the oscillator laser output pulse shape.

The output from the oscillator 51 is amplified in a laser amplifier module 52 consisting for example of a fiber laser amplifier or a diode-pumped solid state rod laser amplifier. In one embodiment of the present invention, the amplifier is an optical amplifier, including a pump that is coupled to a rare-earth-doped fiber loop through an optical coupler. Generally, a semiconductor pump laser is used as a pump, although pumping of optical amplifiers can be achieved by other means as will be evident to one of skill in the art. In a particular embodiment, optical amplifier includes a 5 meter length of rare-earth doped fiber, having a core diameter of approximately 4.8 microns and is doped with Ytterbium to a doping density of approximately $6 \times 10^{24}$ ions/m$^3$. The amplifier also includes a pump, which is an FBG-stabilized semiconductor laser diode operating at a wavelength of 976 nm, and having an output power of 500 mW. In another particular embodiment, the optical amplifier 160 includes a 2 meter length of rare-earth doped fiber, having a core diameter of approximately 10 microns, and is doped with Ytterbium to a doping density of approximately $1 \times 10^{26}$ ions/m$^3$. The amplifier can also include a pump which is a semiconductor laser diode having an output power of 5 W.

Although the example was given for a Ytterbium-doped fiber amplifier and a laser wavelength of 1064 nm, other examples of diode lasers, solid state lasers, and doped fibers operating at 1064 nm or operating at other wavelengths could be used in other embodiments of the present invention. These include for example erbium-doped fiber in the wavelength region 1550 nm and thulium-doped fiber in the wavelength region 2 to 3 microns.

Figure 7:
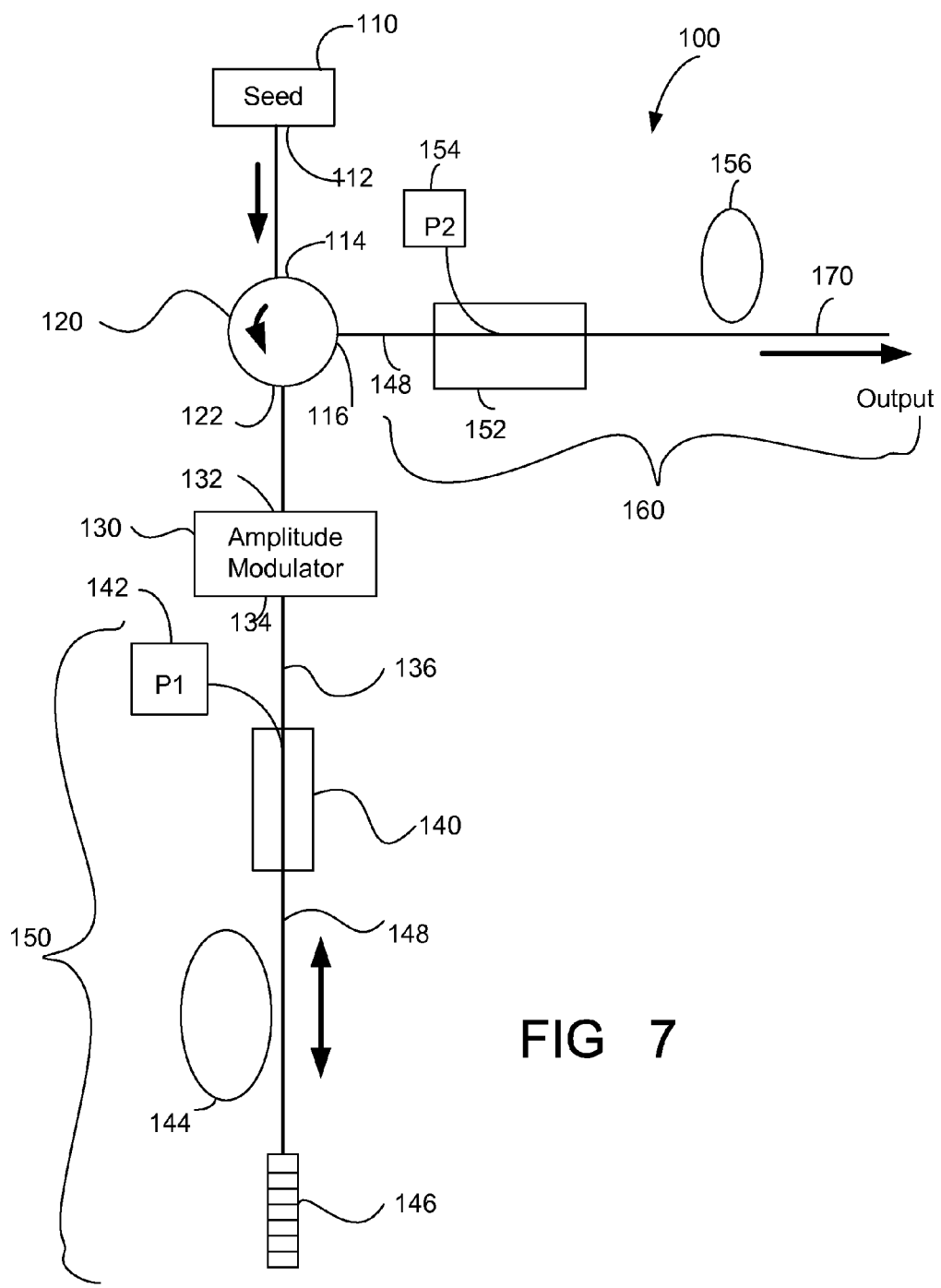
FIG. 7 is a simplified schematic illustration of a pulsed laser with tunable pulse characteristics providing an output series of laser pulses with a predetermined pulse shape according to a an embodiment of the present invention.

With reference to FIG. 7, in an embodiment of the present invention, a pulsed laser source generating bursts of pulses of predetermined pulse shape is provided. U.S. Pat. No. 7,428,253 titled "Method and System for Pulsed Laser Source with Shaped Optical Waveforms" issued Sep. 27, 2008 describes examples of tunable pulsed laser sources and is hereby incorporated by reference in its entirety. In addition, U.S. patent application Ser. No. 12/210,028 titled "Method and system for a Pulsed Laser Source Emitting Shaped Optical Waveforms" filed Sep. 12, 2008, also describes examples of tunable pulsed laser sources and is hereby incorporated by reference in its entirety. The pulsed laser source includes a seed source 110 adapted to generate a seed signal and an optical circulator 120 having a first port 114 coupled to the seed source, a second port 122, and a third port 116. The pulsed laser source also includes an amplitude modulator 130 characterized by a first side 132 coupled to the second port 122 of the optical circulator and a second side 134. The pulsed laser source further includes a first optical amplifier 150 characterized by an input end 136 and a reflective end 146. The input end is coupled to the second side 134 of the amplitude modulator. Moreover, the pulsed laser source includes a second optical amplifier 160 coupled to the third port 116 of the optical circulator. Although FIG. 7 illustrates the use of one optical amplifier 160 coupled to the third port of the optical circulator, this is not required by some embodiments of the invention. In alternative embodiments, multiple optical amplifiers are utilized downstream of the optical circulator as appropriate to the particular applications.

Figure 8:
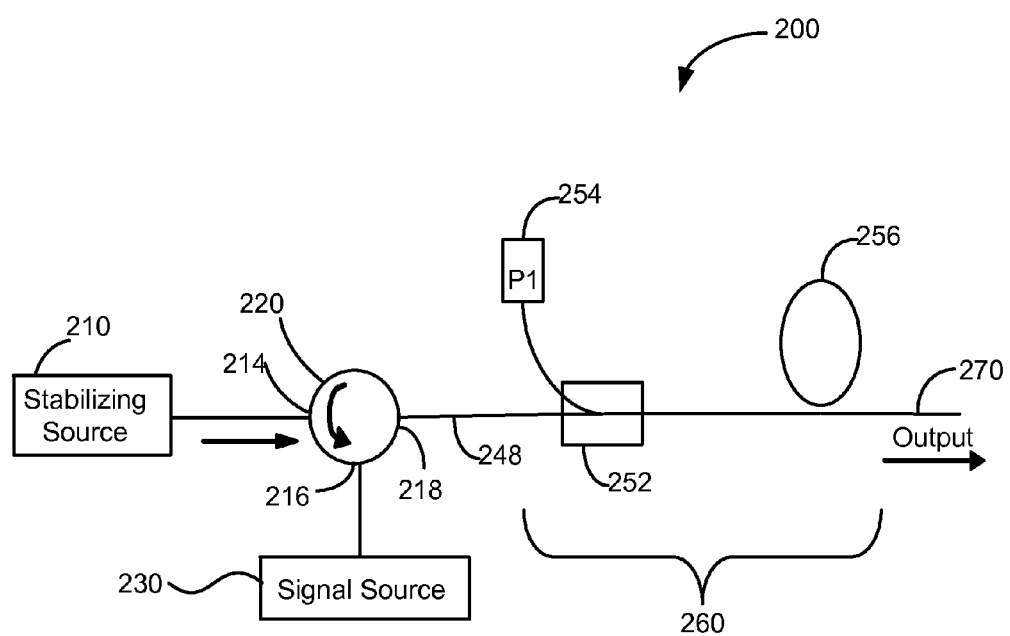
FIG. 8 is a simplified schematic illustration of a pulsed laser with tunable pulse characteristics providing an output series of laser pulses with a predetermined pulse shape according to another embodiment of the present invention.

With reference to FIG. 8, in another embodiment of the present invention, a pulsed laser source generating bursts of pulses of predetermined pulse shape is provided. U.S. Provisional Patent Application No. 61/186,317, describes examples of stable pulsed laser sources and is hereby incorporated by reference in its entirety. The pulsed laser source includes a stabilizing source 210 adapted to generate stabilizing optical radiation, and an optical circulator 220 having a first port 214 coupled to the stabilizing source, a second port 216, and a third port 218. The pulsed laser source also includes a signal source 230 adapted to produce a signal pulse of desired shape wherein the signal source is coupled to the second port 216 of the optical circulator. The pulsed laser source further includes an optical amplifier 260 coupled to the third port 218 of the optical circulator.

Figure 9:
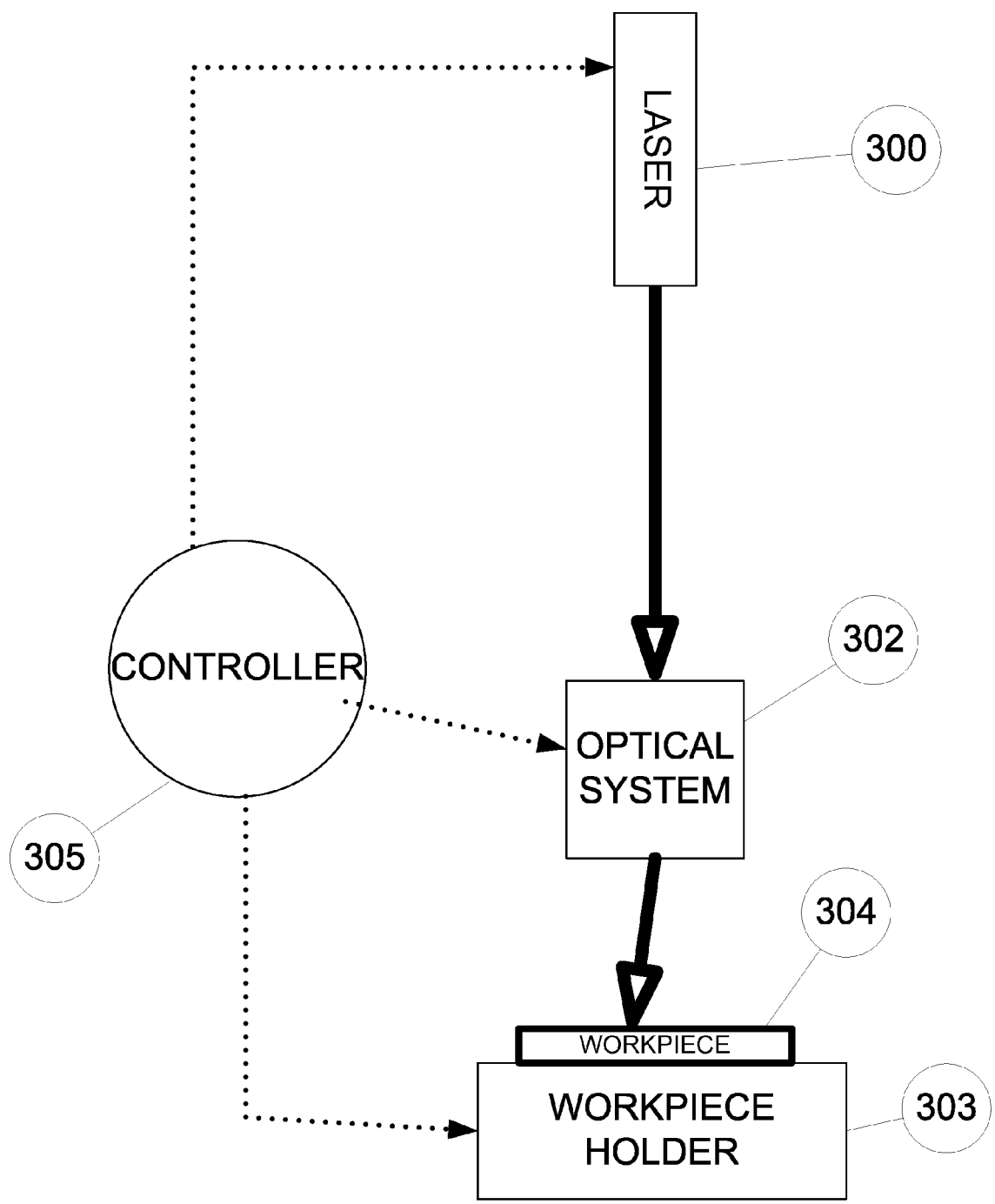
FIG. 9 is a simplified schematic illustration of a laser processing system suitable to scribe a line in a thin film on a substrate according to an embodiment of the present invention.

According to one particular embodiment of the present invention, FIG. 9 shows an exemplary laser processing system capable of scribing a line in a thin film material workpiece 304 using a laser generating a series of pulses with predetermined pulse shape. The system includes a laser source 300, an optical system 302, a controller 305, and a workpiece 304 that is positioned on top of a workpiece holder 303. The laser source 300 provides laser pulses with certain characteristics, such as wavelength, pulse length, pulse shape, and pulse repetition rate. The wavelength, pulse length, and pulse shape may be adjusted according to embodiments of the present invention to scribe a line in a thin film material workpiece using a series of pulses with predetermined pulse shape.

The optical system may include lenses and mirrors for focusing a laser beam on the workpiece, and a component for directing the beam to various positions on the workpiece. In a specific embodiment, the component for directing the beam may be mirrors mounted on galvanometers. The controller may be used to control the optical system and the motion of the component for directing beam. For example, when scribing a line in a thin film workpiece 304, the optical system 302 may be controlled by the controller to scan the beam in a line along the surface of the workpiece such that each focused laser spot is directed to a location adjacent to the previous focused laser spot but with an overlap. In another embodiment, the optical system may focus the laser beam at the surface of the workpiece and the workpiece holder may be controlled by the controller to move the workpiece in a line such that each focused laser pulse impinges on a location adjacent to the previous focused laser pulse in the series of laser pulses but with some spot overlap.

Figure 10:
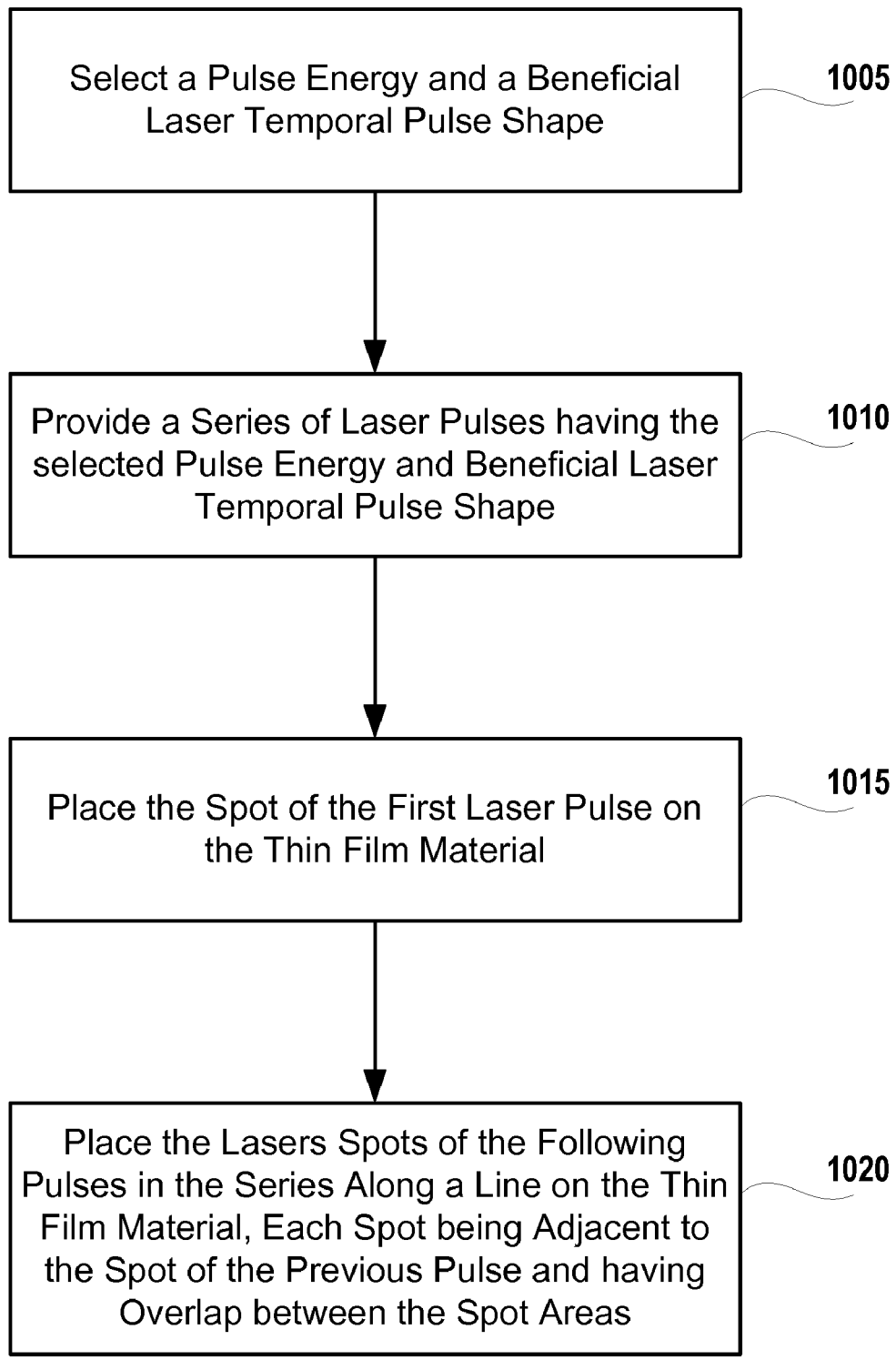
FIG. 10 is a flowchart illustrating a method for scribing a line in a thin film using a series of laser pulses according to an embodiment of the present invention.

FIG. 10 is a flowchart illustrating a method for scribing a line in a thin film using a series of laser pulses according to an embodiment of the present invention. According to an embodiment of this invention, the laser spot of each pulse is placed on the thin film material in a position adjacent to the laser spot of the previous pulse in the series, with some overlap of the spots, in order to scribe a line in the thin film. The use of a series of laser pulses with a pulse energy and a beneficial pulse shape to scribe a line in the thin film has the result of providing a better quality and cleaner scribing process compared to that achieved when using a series of laser pulse of conventional pulse shape.

Referring to FIG. 10, the method includes choosing a pulse energy and temporal pulse shape as appropriate to the particular application (1005). As an example, a beneficial pulse shape can be utilized. A series of laser pulses are provided (1010), each characterized by the pulse energy and shape selected in 1005. The laser spot of the first laser pulse is placed on the thin film material (1015) utilizing an appropriate optical system, which can include lenses, mirrors, and the like. Thus, the laser spot, which can also be referred to as a focused laser spot, can be formed with a spatial distribution appropriate to the particular application. The laser spot of the remaining laser pulses is placed along a line such that each spot is adjacent to the previous spot with some overlap of the spatial distributions of the laser spots (1020).

It should be appreciated that the specific steps illustrated in FIG. 10 provide a particular method of scribing a line in a thin film using a series of laser pulses according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 13:
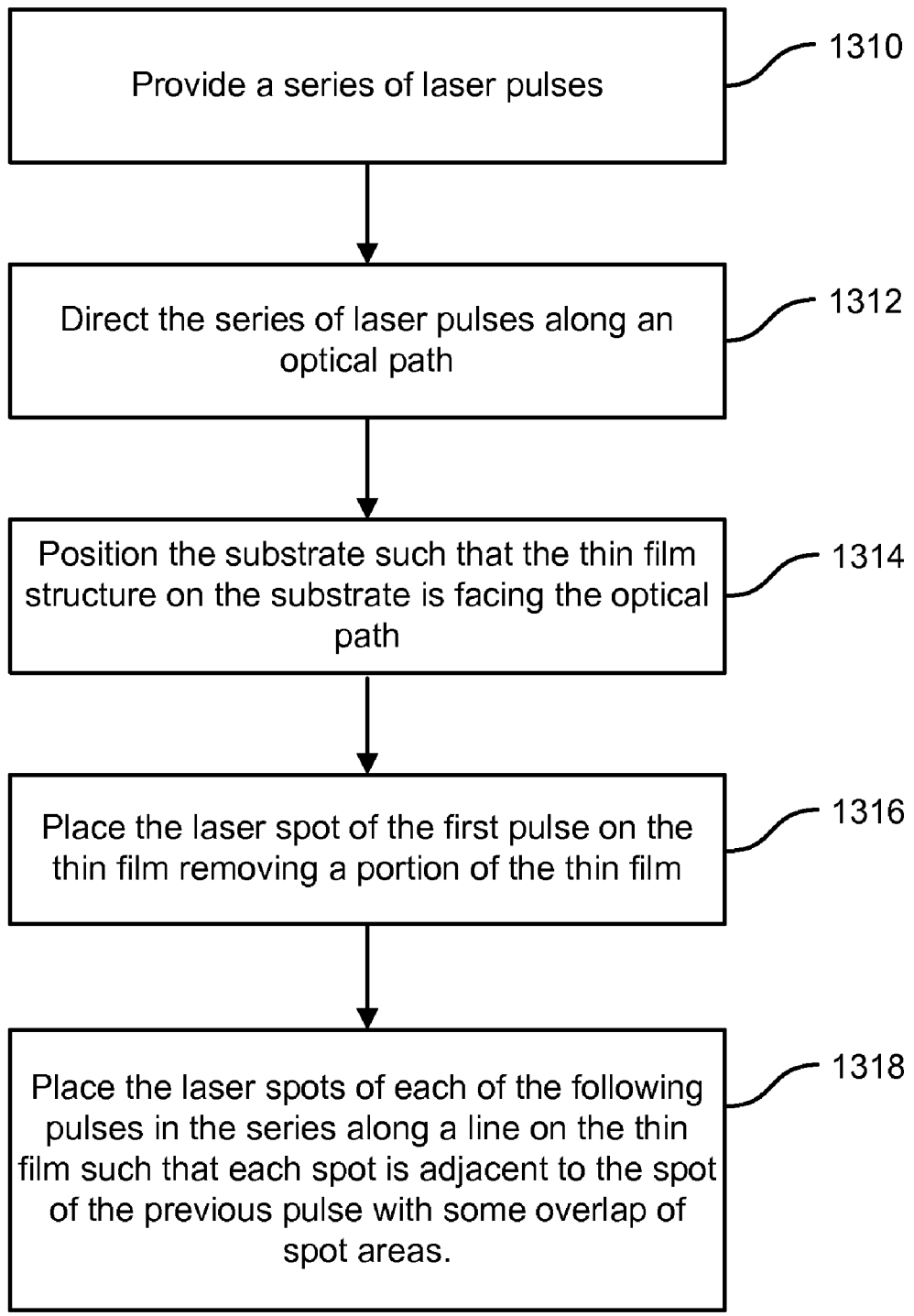
FIG. 13 is a flowchart illustrating a method for scribing a line in a thin film using a series of pulses with a predetermined pulse shape according to an embodiment of the present invention.

FIG. 13 is a flowchart illustrating a method for scribing a line in a thin film using a series of pulses with a predetermined pulse shape according to an embodiment of the present invention. According to an embodiment of this invention, the laser spot of each pulse is placed on the thin film material in a position adjacent to the laser spot of the previous pulse in the series, with some overlap of the spots, in order to scribe a line in a thin film. The use of a series of laser pulses with predetermined pulse shape to scribe a line in the thin film has the result of providing a better quality and cleaner scribing process compared to that achieved when using a series of laser pulses of conventional pulse shape.

Referring to FIG. 13, a series of laser pulses is provided (1310) and directing the series of laser pulses along an optical path (1312). The optical path intersects a thin film structure on a substrate. The method also includes positioning the substrate such that the thin film structure on the substrate is facing the optical path (1314). The laser spot of the first pulse is placed on the thin film in order to remove a portion of the thin film (1316) and the laser spots of the following pulses in the series are placed along a line on the thin film such that each laser spot is adjacent to the laser spot of the previous pulse with some overlap of the spot areas (1318).

It should be appreciated that the specific steps illustrated in FIG. 13 provide a particular method of scribing a line in a thin film using a series of pulses with a predetermined pulse shape according to an embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A laser-based processing method of front surface scribing a pattern in a thin film structure disposed on a substrate, the method comprising:
   providing a series of laser pulses, wherein each laser pulse in the series of laser pulses is characterized by a wavelength, a pulse energy, a pulse width between leading edge and trailing edge 10% power points, a predetermined laser pulse temporal power shape, and a laser spot area, wherein the pulse width is more than 1 ns and less than 10 ns, and wherein the fall time of the trailing edge between 90% to 10% power points is less than 2 ns;
   directing the series of laser pulses along an optical path;
   positioning the substrate having the thin film structure such that the thin film structure faces the optical path;
   placing the laser spot of the first pulse at a spot position on the thin film structure;
   removing at least a portion of the thin film; and
   placing the laser spots of each of the following pulses in the series of pulses at spot positions along a pattern on the thin film such that each spot position is adjacent to the spot position of the laser spot of the previous pulse, and there is an overlap of spot positions such that an overlap area of each spot overlaps in some amount an overlap area of each previous spot.

2. The method of claim 1 wherein the thin film includes copper indium gallium diselenide material.

3. The method of claim 2 wherein the copper indium gallium diselenide material is characterized by a bandgap energy wavelength and the laser wavelength is longer than the bandgap energy wavelength.

4. The method of claim 1 wherein an energy density of the laser pulse at the thin film material is more than $0.2$ J/cm$^2$ but less than $0.7$ J/cm$^2$ wherein energy density is defined as the pulse energy divided by the laser spot area.

5. The method of claim 1 wherein the overlap areas of two adjacent spots are more than 2% but less than 50% of the laser spot area.

6. The method of claim 1 wherein the predetermined laser pulse temporal power shape has a flat top.

7. The method of claim 1 where the predetermined laser pulse temporal power shape is further characterized by a leading edge risetime between 10% and 90% power points of less than 6 ns.

8. The method of claim 1 wherein the thin film includes copper indium diselenide material.

9. The method of claim 8 where the copper indium diselenide material is characterized by a bandgap energy wavelength and the laser wavelength is longer than the bandgap energy wavelength.

10. The method of claim 8 wherein the pulse energy of the laser pulse is chosen to provide an energy density at the thin film material of more than $0.2$ J/cm$^2$ but less than $0.7$ J/cm$^2$ wherein energy density is the pulse energy divided by the laser spot area.

11. The method of claim 8 wherein the overlap areas of two adjacent spots are more than 2% but less than 50% of the laser spot area.

12. The method of claim 8 wherein the predetermined laser pulse temporal power shape has a flat top.

13. The method of claim 8 where the predetermined laser pulse temporal power shape is further characterized by a leading edge risetime between 10% and 90% power points of less than 6 ns.

14. A laser-based processing method of front surface scribing a pattern in a thin film structure disposed on a substrate, the method comprising:

providing a series of laser pulses, wherein each laser pulse in the series of laser pulses is characterized by a wavelength, a pulse energy, a pulse width between leading edge and trailing edge 10% power points, a predetermined laser pulse temporal power shape, and a laser spot area, wherein the pulse width is more than 1 ns and less than 10 ns, and wherein the energy contained in the time period of the pulse following the trailing edge 50% power point is less than 5% of the pulse energy;

directing the series of laser pulses along an optical path;

positioning the substrate having the thin film structure such that the thin film structure faces the optical path;

placing the laser spot of the first pulse at a spot position on the thin film structure;

removing at least a portion of the thin film; and placing the laser spots of each of the following pulses in the series of pulses at spot positions along a pattern on the thin film such that each spot position is adjacent to the spot position of the laser spot of the previous pulse, and there is an overlap of spot positions such that an overlap area of each spot overlaps in some amount an overlap area of each previous spot.

15. The method of claim 14 wherein the thin film includes copper indium gallium diselenide material.

16. The method of claim 14 wherein the pattern is a line.

17. The method of claim 14 wherein the pattern is a closed loop.

18. The method of claim 14 wherein the pattern is a curve.

19. The method of claim 14 wherein the copper indium gallium diselenide material is characterized by a bandgap energy wavelength and the laser wavelength is longer than the bandgap energy wavelength.

20. The method of claim 14 wherein an energy density of the laser pulse at the thin film material is more than $0.2$ $J/cm^2$ but less than $0.7$ $J/cm^2$ wherein energy density is defined as the pulse energy divided by the laser spot area.

21. The method of claim 14 wherein the overlap areas of two adjacent spots are more than 2% but less than 50% of the laser spot area.

22. The method of claim 14 wherein the predetermined laser pulse temporal power shape is further characterized by a leading edge risetime between 10% and 90% power points of less than 6 ns.

23. The method of claim 14 wherein the thin film includes copper indium diselenide material.

24. The method of claim 23 wherein an energy density of the laser pulse at the thin film material is more than $0.2$ $J/cm^2$ but less than $0.7$ $J/cm^2$ wherein energy density is defined as the pulse energy divided by the laser spot area.

25. The method of claim 23 wherein the copper indium diselenide material is characterized by a bandgap energy wavelength and the laser wavelength is longer than the bandgap energy wavelength.

26. The method of claim 23 wherein the pulse energy of the laser pulse is chosen to provide an energy density at the thin film material of more than $0.2$ $J/cm^2$ but less than $0.7$ $J/cm^2$ wherein energy density is the pulse energy divided by the laser spot area.

27. The method of claim 23 where the predetermined laser pulse temporal power shape is further characterized by a leading edge risetime between 10% and 90% power points of less than 6 ns.

* * * * *